United States Patent
Li

(10) Patent No.: US 12,542,978 B2
(45) Date of Patent: Feb. 3, 2026

(54) IMAGE LIGHT SUPPLEMENTATION METHOD AND ELECTRONIC DEVICE

(71) Applicant: Honor Device Co., Ltd., Shenzhen (CN)

(72) Inventor: Chungyuen Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 358 days.

(21) Appl. No.: 18/264,855

(22) PCT Filed: Sep. 8, 2022

(86) PCT No.: PCT/CN2022/117957
§ 371 (c)(1),
(2) Date: Aug. 9, 2023

(87) PCT Pub. No.: WO2023/040754
PCT Pub. Date: Mar. 23, 2023

(65) Prior Publication Data
US 2024/0314450 A1 Sep. 19, 2024

(30) Foreign Application Priority Data
Sep. 18, 2021 (CN) .......................... 202111113526.7

(51) Int. Cl.
*H04N 23/76* (2023.01)
*G06T 7/70* (2017.01)
(Continued)

(52) U.S. Cl.
CPC .............. *H04N 23/76* (2023.01); *G06T 7/70* (2017.01); *G06V 10/60* (2022.01); *H04N 23/631* (2023.01); *H04N 23/64* (2023.01); *H04N 23/71* (2023.01)

(58) Field of Classification Search
CPC ...... H04N 23/76; H04N 23/631; H04N 23/64; H04N 23/71; H04N 23/611; H04N 23/633; G06T 7/70; G06V 10/60; G06V 10/25
(Continued)

(56) References Cited

U.S. PATENT DOCUMENTS

2013/0089256 A1 4/2013 Tsukada
2016/0042551 A1 2/2016 Imber et al.
(Continued)

FOREIGN PATENT DOCUMENTS

CN 109040612 A 12/2018
CN 109785423 A 5/2019
(Continued)

OTHER PUBLICATIONS

Zhang Cuiping: "3D Face Structure Extraction from Images at Arbitrary Poses and under Arbitrary Illumination Conditions", Internet Citation, Oct. 1, 2006 (Oct. 1, 2006), p. 191.

*Primary Examiner* — Stephen P Coleman
(74) *Attorney, Agent, or Firm* — Slater Matsil, LLP

(57) ABSTRACT

An electronic device first obtains a to-be-processed image, where a side of a face of a first user in the to-be-processed image lacks illumination, causing the side to be darker. Then, a first image is obtained from the to-be-processed image. Then, an albedo image and an illumination image of the first image are calculated, and light supplementation is performed on the first image by using the albedo image and the illumination image, to obtain a light-supplemented first image. Then, the electronic device replaces the first image in the to-be-processed image with the light-supplemented first image.

14 Claims, 21 Drawing Sheets

(51) Int. Cl.
  *G06V 10/60* (2022.01)
  *H04N 23/60* (2023.01)
  *H04N 23/63* (2023.01)
  *H04N 23/71* (2023.01)
(58) Field of Classification Search
  USPC .......................................................... 382/274
  See application file for complete search history.

(56) References Cited

U.S. PATENT DOCUMENTS

2019/0325640 A1* 10/2019 Jiddi ..................... G06T 17/00
2020/0068113 A1   2/2020 Chien et al.

FOREIGN PATENT DOCUMENTS

| CN | 111063017 A | 4/2020 |
| CN | 111597963 A | 8/2020 |
| CN | 112927200 A | 6/2021 |
| CN | 113240622 A | 8/2021 |

* cited by examiner

To-be-processed image

First image

Normal vector image (a)            (b)            (c)

(d)            (e)            (f)

(a)

(b)

(c)

IMAGE LIGHT SUPPLEMENTATION METHOD AND ELECTRONIC DEVICE

CROSS-REFERENCE TO RELATED APPLICATIONS

This application is a National Stage of International Application No. PCT/CN2022/117957, filed on Sep. 8, 2022, which claims priority to Chinese Patent Application No. 202111113526.7, filed on Sep. 18, 2021, both of which are hereby incorporated by reference in their entireties.

TECHNICAL FIELD

This application relates to the field of terminal and artificial intelligence, and in particular, to an image light supplementation method and an electronic device.

BACKGROUND

With rapid development of the information age, capturing functions of electronic devices such as mobile phones are gradually improved, so that more and more users like to capture images by using the electronic devices. Photography is art of light and shadow. If someone intends to capture a high-quality image, proper illumination is essential for imaging of a captured object. However, in many scenes, illumination on a surface of the captured object is uneven. For example, when the captured object is captured when illuminated from a side under strong sunlight, one side of the captured object is illuminated and the other side is not illuminated. As a result, in an image captured by an electronic device, quality of the one side of the captured object is normal, but quality of the other side is affected due to problems such as darkening because there is no proper illumination.

To resolve the foregoing problems, when the electronic device captures the image, a user may perform, by using an artificial light source, light supplementation on a region of the captured object that is not illuminated or lacks illumination, so that the surface of the captured object has proper illumination. In this case, when the electronic device performs capturing again, an adverse effect of illumination on a capturing effect can be reduced.

However, when the electronic device captures an image, it is difficult for most users to perform light supplementation by using such an external device. This is because not only a professional external device but also professional light supplementation skills are required. Therefore, a computing capability of the electronic device is used to perform light supplementation on part or all of captured objects in the image, to improve quality of image.

SUMMARY

This application provides an image light supplementation method and an electronic device. During capturing, instead of using supplemented light from an external device, the electronic device can also implement image light supplementation, and adjust a shadow region in an image.

According to a first aspect, an embodiment of this application provides an image light supplementation method, applied to an electronic device including a camera. The method includes: displaying a first interface, where the first interface includes a first control; detecting a first operation for the first control; acquiring a to-be-processed image through the camera in response to the first operation, where the to-be-processed image includes a first target object, and the first target object is in first ambient light; obtaining a first ambient light parameter based on a first region image, where the first region image is an image of the first target object in the to-be-processed image; determining a pose parameter of the first target object in the to-be-processed image, where the pose parameter identifies pose information of the first target object; determining a second ambient light parameter based on the first ambient light parameter and the pose parameter; obtaining an illumination image based on a normal vector image and the second ambient light parameter, where the normal vector image is an image obtained based on a normal vector feature of the to-be-processed image; and obtaining a light-supplemented image based on the illumination image and an albedo image, where the albedo image is an image obtained based on an albedo feature of the to-be-processed image.

In the foregoing embodiment, for a to-be-processed image that needs light supplementation, the electronic device may indicate, by using an illumination image of the to-be-processed image, intensity of illumination corresponding to any pixel point of the to-be-processed image under light-supplemented illumination, and indicate, by using an albedo image of the to-be-processed image, absorption intensity corresponding to any pixel point of the to-be-processed image to the illumination under the light-supplemented illumination. Then, a light-supplemented to-be-processed image is obtained based on the illumination image and the albedo image, which is equivalent to restoring a capturing scene. Then, illumination of the capturing scene is optimized, and light supplementation is performed on the to-be-processed image again, to improve quality of an image obtained by the electronic device.

With reference to the first aspect, in an implementation, the obtaining an illumination image based on a normal vector image and the second ambient light parameter, where the normal vector image is an image obtained based on a normal vector feature of the to-be-processed image further includes: obtaining the illumination image based on the normal vector image and the second ambient light parameter, where the normal vector image is an image obtained based on a normal vector feature of the first region image; the obtaining a light-supplemented image based on the illumination image and an albedo image, where the albedo image is an image obtained based on an albedo feature of the to-be-processed image further includes: obtaining the light-supplemented image based on the illumination image and the albedo image, where the albedo image is an image obtained based on an albedo feature of the first region image; and after the obtaining a light-supplemented image based on the illumination image and an albedo image, the method further includes: replacing the first region image in the to-be-processed image with the light-supplemented image.

In the foregoing embodiment, for a to-be-processed image that needs light supplementation, the electronic device may targetedly perform light supplementation on an image corresponding to one region in the to-be-processed image, and replace the image corresponding to the region with an image corresponding to a light-supplemented region, to obtain a light-supplemented to-be-processed image. In this way, the solution can be made more targeted, for example, light supplementation can be performed on a face. In addition, the image corresponding to the region is processed to obtain the light-supplemented to-be-processed image, which can also reduce computing resources.

With reference to the first aspect, in an implementation, in a case that the albedo image is the image obtained based on the albedo feature of the to-be-processed image, the albedo image is for describing acceptance degrees of any pixel in the to-be-processed image to light intensity on a red channel, a green channel, and a blue channel, and the illumination image is for describing, in second ambient light, light intensity of any pixel in the to-be-processed image on the red channel, the green channel, and the blue channel; or in a case that the albedo image is the image obtained based on the albedo feature of the first region image, the albedo image is for describing acceptance degrees of any pixel in the first region image to light intensity on a red channel, a green channel, and a blue channel, and the illumination image is for describing, in second ambient light, light intensity of any pixel in the first region image on the red channel, the green channel, and the blue channel.

In the foregoing embodiment, the electronic device may indicate, by using an illumination image of a to-be-processed image, intensity of illumination corresponding to any pixel point of the to-be-processed image under light-supplemented illumination, and indicate, by using an albedo image of the to-be-processed image, absorption intensity corresponding to any pixel point of the to-be-processed image to the illumination under the light-supplemented illumination. Then, a light-supplemented to-be-processed image is obtained based on the illumination image and the albedo image, which is equivalent to restoring a capturing scene. In this way, the obtained light-supplemented image is more in line with physical meanings.

With reference to the first aspect, in an implementation, the first target object is a portrait of a first user.

In the foregoing embodiment, the electronic device may targetedly perform light supplementation on the portrait in the to-be-processed image.

With reference to the first aspect, in an implementation, the first ambient light parameter is first spherical harmonic illumination, and the second ambient light parameter is second spherical harmonic illumination; and the determining a second ambient light parameter based on the first ambient light parameter and the pose parameter further includes: determining, by the electronic device, the first spherical harmonic illumination of the first ambient light, where the first spherical harmonic illumination indicates information about the first ambient light, and the information includes light intensity and a direction of the first ambient light, and light intensity and a direction of any point around the first target object in the first ambient light; determining a direction of the first target object based on the pose parameter of the first target object, where the pose parameter of the first target object includes at least one of a pitch angle, a yaw angle, a roll angle, and other pose information of the first target object in a camera coordinate system, and the direction of the first target object is for describing an orientation of the first target object; obtaining, based on the first spherical harmonic illumination and the direction of the first target object, light intensity and a direction of supplemented light; and adjusting the first spherical harmonic illumination based on the light intensity and the direction of the supplemented light, to obtain the second spherical harmonic illumination, where the second spherical harmonic illumination indicates information about the second ambient light, and the information includes light intensity and a direction of the second ambient light, and light intensity and a direction of any point around the first target object in the second ambient light.

In the foregoing embodiment, by indicating ambient light by using spherical harmonic illumination, a calculation process may be simplified, so that the solved ambient light is more accurate, and an effect in which the electronic device obtains a light-supplemented to-be-processed image can be optimized.

With reference to the first aspect, in an implementation, the obtaining, based on the first spherical harmonic illumination and the direction of the first target object, light intensity and a direction of supplemented light further includes: determining the light intensity and the direction of the first ambient light based on the first spherical harmonic illumination; using a plane formed by the direction of the first target object and a first direction as a first plane, where the first direction is a direction that rotates around a Z axis of the camera coordinate system at a same angle as the roll angle and is parallel to one of a start side or an end side of the roll angle; determining a direction meeting a first preset condition as the direction of the supplemented light based on the direction of the first ambient light, the direction of the first target object, and the first plane; and determining 0.25 times the light intensity of the first ambient light as the light intensity of the supplemented light.

In the foregoing embodiment, light intensity and a direction of ambient light before light supplementation are determined based on the first spherical harmonic illumination, the direction of the supplemented light is determined based on the direction of the ambient light before the light supplementation and a direction of a light-supplemented object, and the intensity of the supplemented light is determined based on the intensity of the ambient light before the light supplementation. In this way, the solved supplemented light has stronger availability, and it is more likely to obtain a light-supplemented to-be-processed image that is more in line with aesthetics of a user.

With reference to the first aspect, in an implementation, the first preset condition is that: A projection of the direction of the supplemented light on the first plane is a first projection, and the first projection coincides with a second projection, where the second projection is a projection of the direction of the first ambient light on the first plane; an angle between the direction of the supplemented light and the second projection is a first angle, and the first angle is 0.8 to 2 times a second angle, where the second angle is an angle between the direction of the first ambient light between the second projection; and the direction of the supplemented light is on one side of the first plane, but the direction of the first ambient light is on the other side of the first plane.

In the foregoing embodiment, a light supplementation principle used by the electronic device in this case is positive light supplementation. The positive light supplementation may be for filling a shadow region caused by the first ambient light on a subject (for example, a face or a portrait), so that the shadow region can be brighten. Generally, the light intensity of the supplemented light is lower than the light intensity of the first ambient light. A purpose of this is to make the subject in the shadow region more prominent without creating additional shadows.

With reference to the first aspect, in an implementation, in a case that the supplemented light includes first supplemented light and second supplemented light, the direction of the supplemented light includes a direction of the first supplemented light and a direction of the second supplemented light, and the first preset condition is that: The first supplemented light is on one side of the first plane, but the second supplemented light is on the other side of the first plane; a projection of the first supplemented light on the first plane is a third projection, a projection of the second supplemented light on the first plane is a fourth projection, and the third projection coincides with the fourth projection;

an angle between the third projection and a direction of a first portrait and an angle between the fourth projection and the direction of the first portrait are 10° to 20°; and an angle between the first supplemented light and a first projection and an angle between the second supplemented light and the fourth projection are 40° to 50°.

In the foregoing embodiment, a light supplementation principle used by the electronic device in this case is Rembrandt light. In this case, the supplemented light is often placed at about 45° of the left front and the right front of a subject, which has a farther distance and is slightly higher than a line of sight of a portrait. A purpose of this is to create more chiaroscuro and depth for a face, with soft transitions between light and dark.

With reference to the first aspect, in an implementation, in a case that the supplemented light includes first supplemented light and second supplemented light, the direction of the supplemented light includes a direction of the first supplemented light and a direction of the second supplemented light, and the first preset condition is that: The first supplemented light is on one side of the first plane, but the second supplemented light is on the other side of the first plane; a projection of the first supplemented light on the first plane is a third projection, a projection of the second supplemented light on the first plane is a fourth projection, and the third projection coincides with the fourth projection; the third projection and the fourth projection coincide with a spherical center G; and an angle between the direction of the first supplemented light and a direction of a first portrait and an angle between the direction of the second supplemented light and the direction of the first portrait are 90°.

In the foregoing embodiment, a light supplementation principle used by the electronic device in this case is light splitting. In this case, the supplemented light is often placed at a right left side and a right right side of a subject, which has an appropriate distance and is parallel to a line of sight of a portrait. A purpose of this is to create strong and dramatic chiaroscuro for a face, with sharp transitions between light and dark, and a dark side completely in shadow.

With reference to the first aspect, in an implementation, the obtaining, based on the first spherical harmonic illumination and the direction of the first target object, light intensity and a direction of supplemented light further includes: determining the light intensity and the direction of the first ambient light based on the first spherical harmonic illumination; using a plane formed by a direction of a first portrait and the direction of the first ambient light as a second plane; determining, in the second plane, a direction whose angle with the direction of the first ambient light is 0° to 10° as the direction of the supplemented light; and determining 0.25 times the light intensity of the first ambient light as the light intensity of the supplemented light.

In the foregoing embodiment, a light supplementation principle used by the electronic device in this case is negative light supplementation. In this case, the supplemented light is often for strengthening light rays of a non-shadow region. A purpose of this is to strengthen chiaroscuro of a subject.

With reference to the first aspect, in an implementation, the obtaining, based on the first spherical harmonic illumination and the direction of the first target object, light intensity and a direction of supplemented light further includes: determining the light intensity of the first ambient light based on the first spherical harmonic illumination; determining 0.25 times the light intensity of the first ambient light as the light intensity of the supplemented light; and determining a direction of a first portrait as the direction of the supplemented light.

In the foregoing embodiment, a light supplementation principle used by the electronic device in this case is rimming light. In this case, the supplemented light is often placed behind a subject. For example, in a case that the subject is a portrait, the supplemented light is projected onto a head and shoulders of the portrait. In addition, the front of the portrait is not to be too dark. A purpose of this is to highlight the portrait, namely, the subject, and create an overall sense of layering.

According to a second aspect, this application provides an electronic device. The electronic device includes: one or more processors, and one or more memories, where the memories are coupled to the one or more processors, the memories are configured to store computer program code, the computer program code includes computer instructions, and the one or more processors invoke the computer instructions to enable the electronic device to perform the following steps: displaying a first interface, where the first interface includes a first control; detecting a first operation for the first control; acquiring a to-be-processed image through the camera in response to the first operation, where the to-be-processed image includes a first target object, and the first target object is in first ambient light; obtaining a first ambient light parameter based on a first region image, where the first region image is an image of the first target object in the to-be-processed image; determining a pose parameter of the first target object in the to-be-processed image, where the pose parameter identifies pose information of the first target object; determining a second ambient light parameter based on the first ambient light parameter and the pose parameter; obtaining an illumination image based on a normal vector image and the second ambient light parameter, where the normal vector image is an image obtained based on a normal vector feature of the to-be-processed image; and obtaining a light-supplemented image based on the illumination image and an albedo image, where the albedo image is an image obtained based on an albedo feature of the to-be-processed image.

In the foregoing embodiment, for a to-be-processed image that needs light supplementation, the electronic device may indicate, by using an illumination image of the to-be-processed image, intensity of illumination corresponding to any pixel point of the to-be-processed image under light-supplemented illumination, and indicate, by using an albedo image of the to-be-processed image, absorption intensity corresponding to any pixel point of the to-be-processed image to the illumination under the light-supplemented illumination. Then, a light-supplemented to-be-processed image is obtained based on the illumination image and the albedo image, which is equivalent to restoring a capturing scene. Then, illumination of the capturing scene is optimized, and light supplementation is performed on the to-be-processed image again, to improve quality of an image obtained by the electronic device.

With reference to the second aspect, in an implementation, the one or more processors are further configured to invoke the computer instructions to enable the electronic device to perform the following steps: obtaining the illumination image based on the normal vector image and the second ambient light parameter, where the normal vector image is an image obtained based on a normal vector feature of the first region image; and obtaining the light-supplemented image based on the illumination image and the albedo image, where the albedo image is an image obtained based on an albedo feature of the first region image; and the one or more processors are further configured to invoke the computer instructions to enable the electronic device to perform the following step: replacing the first region image in the to-be-processed image with the light-supplemented image.

In the foregoing embodiment, for a to-be-processed image that needs light supplementation, the electronic device may targetedly perform light supplementation on an image corresponding to one region in the to-be-processed image, and replace the image corresponding to the region with an image corresponding to a light-supplemented region, to obtain a light-supplemented to-be-processed image. In this way, the solution can be made more targeted, for example, light supplementation can be performed on a face. In addition, the image corresponding to the region is processed to obtain the light-supplemented to-be-processed image, which can also reduce computing resources.

With reference to the second aspect, in an implementation, the one or more processors are further configured to invoke the computer instructions to enable the electronic device to perform the following steps: determining, by the electronic device, the first spherical harmonic illumination of the first ambient light, where the first spherical harmonic illumination indicates information about the first ambient light, and the information includes light intensity and a direction of the first ambient light, and light intensity and a direction of any point around the first target object in the first ambient light; determining a direction of the first target object based on the pose parameter of the first target object, where the pose parameter of the first target object includes at least one of a pitch angle, a yaw angle, a roll angle, and other pose information of the first target object in a camera coordinate system, and the direction of the first target object is for describing an orientation of the first target object; obtaining, based on the first spherical harmonic illumination and the direction of the first target object, light intensity and a direction of supplemented light; and adjusting the first spherical harmonic illumination based on the light intensity and the direction of the supplemented light, to obtain the second spherical harmonic illumination, where the second spherical harmonic illumination indicates information about the second ambient light, and the information includes light intensity and a direction of the second ambient light, and light intensity and a direction of any point around the first target object in the second ambient light.

In the foregoing embodiment, by indicating ambient light by using spherical harmonic illumination, a calculation process may be simplified, so that the solved ambient light is more accurate, and an effect in which the electronic device obtains a light-supplemented to-be-processed image can be optimized.

With reference to the second aspect, in an implementation, the one or more processors are further configured to invoke the computer instructions to enable the electronic device to perform the following steps: determining the light intensity and the direction of the first ambient light based on the first spherical harmonic illumination; using a plane formed by the direction of the first target object and a first direction as a first plane, where the first direction is a direction that rotates around a Z axis of the camera coordinate system at a same angle as the roll angle and is parallel to one of a start side or an end side of the roll angle; determining a direction meeting a first preset condition as the direction of the supplemented light based on the direction of the first ambient light, the direction of the first target object, and the first plane; and determining 0.25 times the light intensity of the first ambient light as the light intensity of the supplemented light.

In the foregoing embodiment, light intensity and a direction of ambient light before light supplementation are determined based on the first spherical harmonic illumination, the direction of the supplemented light is determined based on the direction of the ambient light before the light supplementation and a direction of a light-supplemented object, and the intensity of the supplemented light is determined based on the intensity of the ambient light before the light supplementation. In this way, the solved supplemented light has stronger availability, and it is more likely to obtain a light-supplemented to-be-processed image that is more in line with aesthetics of a user.

With reference to the second aspect, in an implementation, the one or more processors are further configured to invoke the computer instructions to enable the electronic device to perform the following steps: determining the light intensity and the direction of the first ambient light based on the first spherical harmonic illumination; using a plane formed by a direction of a first portrait and the direction of the first ambient light as a second plane; determining, in the second plane, a direction whose angle with the direction of the first ambient light is 0° to 10° as the direction of the supplemented light; and determining 0.25 times the light intensity of the first ambient light as the light intensity of the supplemented light.

In the foregoing embodiment, a light supplementation principle used by the electronic device in this case is negative light supplementation. In this case, the supplemented light is often for strengthening light rays of a non-shadow region. A purpose of this is to strengthen chiaroscuro of a subject.

With reference to the second aspect, in an implementation, the one or more processors are further configured to invoke the computer instructions to enable the electronic device to perform the following steps: determining the light intensity of the first ambient light based on the first spherical harmonic illumination; determining 0.25 times the light intensity of the first ambient light as the light intensity of the supplemented light; and determining a direction of a first portrait as the direction of the supplemented light.

In the foregoing embodiment, a light supplementation principle used by the electronic device in this case is rimming light. In this case, the supplemented light is often placed behind a subject. For example, in a case that the subject is a portrait, the supplemented light is projected onto a head and shoulders of the portrait. In addition, the front of the portrait is not to be too dark. A purpose of this is to highlight the portrait, namely, the subject, and create an overall sense of layering.

According to a third aspect, this application provides an electronic device. The electronic device includes: one or more processors and a memory, where the memory is coupled to the one or more processors, the memory is configured to store computer program code, the computer program code includes computer instructions, and the one or more processors invoke the computer instructions to enable the electronic device to perform the method described in the first aspect or any of the implementations of the first aspect.

In the foregoing embodiment, for a to-be-processed image that needs light supplementation, the electronic device may indicate, by using an illumination image of the to-be-processed image, intensity of illumination corresponding to any pixel point of the to-be-processed image under light-supplemented illumination, and indicate, by using an albedo image of the to-be-processed image, absorption intensity corresponding to any pixel point of the to-be-processed image to the illumination under the light-supplemented illumination. Then, a light-supplemented to-be-processed image is obtained based on the illumination image and the albedo image, which is equivalent to restoring a capturing scene. Then, illumination of the capturing scene is optimized, and light supplementation is performed on the to-be-processed image again, to improve quality of an image obtained by the electronic device.

According to a fourth aspect, an embodiment of this application provides a chip system. The chip system is used in an electronic device. The chip system includes one or more processors, and the processors are configured to invoke computer instructions to enable the electronic device to perform the method described in the first aspect or any of the implementations of the first aspect.

In the foregoing embodiment, for a to-be-processed image that needs light supplementation, the electronic device may indicate, by using an illumination image of the to-be-processed image, intensity of illumination corresponding to any pixel point of the to-be-processed image under light-supplemented illumination, and indicate, by using an albedo image of the to-be-processed image, absorption intensity corresponding to any pixel point of the to-be-processed image to the illumination under the light-supplemented illumination. Then, a light-supplemented to-be-processed image is obtained based on the illumination image and the albedo image, which is equivalent to restoring a capturing scene. Then, illumination of the capturing scene is optimized, and light supplementation is performed on the to-be-processed image again, to improve quality of an image obtained by the electronic device.

According to a fifth aspect, an embodiment of this application provides a computer program product including instructions, and when the computer program product is run on an electronic device, the electronic device is enabled to perform the method described in the first aspect or any of the implementations of the first aspect.

In the foregoing embodiment, for a to-be-processed image that needs light supplementation, the electronic device may indicate, by using an illumination image of the to-be-processed image, intensity of illumination corresponding to any pixel point of the to-be-processed image under light-supplemented illumination, and indicate, by using an albedo image of the to-be-processed image, absorption intensity corresponding to any pixel point of the to-be-processed image to the illumination under the light-supplemented illumination. Then, a light-supplemented to-be-processed image is obtained based on the illumination image and the albedo image, which is equivalent to restoring a capturing scene. Then, illumination of the capturing scene is optimized, and light supplementation is performed on the to-be-processed image again, to improve quality of an image obtained by the electronic device.

According to a sixth aspect, an embodiment of this application provides a computer-readable storage medium, including instructions, and when the instructions are run on an electronic device, the electronic device is enabled to perform the method described in the first aspect or any of the implementations of the first aspect.

In the foregoing embodiment, for a to-be-processed image that needs light supplementation, the electronic device may indicate, by using an illumination image of the to-be-processed image, intensity of illumination corresponding to any pixel point of the to-be-processed image under light-supplemented illumination, and indicate, by using an albedo image of the to-be-processed image, absorption intensity corresponding to any pixel point of the to-be-processed image to the illumination under the light-supplemented illumination. Then, a light-supplemented to-be-processed image is obtained based on the illumination image and the albedo image, which is equivalent to restoring a capturing scene. Then, illumination of the capturing scene is optimized, and light supplementation is performed on the to-be-processed image again, to improve quality of an image obtained by the electronic device.

DETAILED DESCRIPTION OF ILLUSTRATIVE EMBODIMENTS

Terms used in the following embodiments of this application are only intended to describe particular embodiments, and are not intended to limit this application. As used in this specification and the claims of this application, a singular expression form, "one", "a", "said", "foregoing", "the", or "this", is intended to also include a plural expression form, unless clearly indicated to the contrary in the context. It should be further understood that the term "and/or" used in this application indicates and includes any or all possible combinations of one or more listed items.

In the following, the terms "first" and "second" are only used for description purposes, and cannot be understood as indicating or implying relative importance or implicitly indicating a quantity of indicated technical features. Therefore, a feature defined to be "first" or "second" may explicitly or implicitly include one or more features. In the description of embodiments of this application, unless otherwise stated, "a plurality of" means two or more.

A term "user interface (user interface, UI)" in the following embodiments of this application is a medium interface for interaction and information exchange between an application or operating system and a user, and implements the conversion between an internal form of information and a form of the information acceptable to the user. The user interface is source code written in a specific computer language such as java and the extensible markup language (extensible markup language, XML). The interface source code is parsed and rendered on an electronic device, and is finally presented as content that can be recognized by the user. A commonly used form of the user interface is a graphic user interface (graphic user interface, GUI), which refers to a user interface that is related to computer operations and that is displayed in a graphic manner. The graphic user interface may be visible interface elements such as text, icons, buttons, menus, tabs, text boxes, dialog boxes, status bars, navigation bars, and Widgets that are displayed on a display screen of the electronic device.

In a solution, when an electronic device captures a first user, when part or all of regions of the first user may lack illumination due to improper illumination for the first user, light supplementation may be performed by using an external device, so that a region in which the first user is located has proper illumination.

Figure 1:
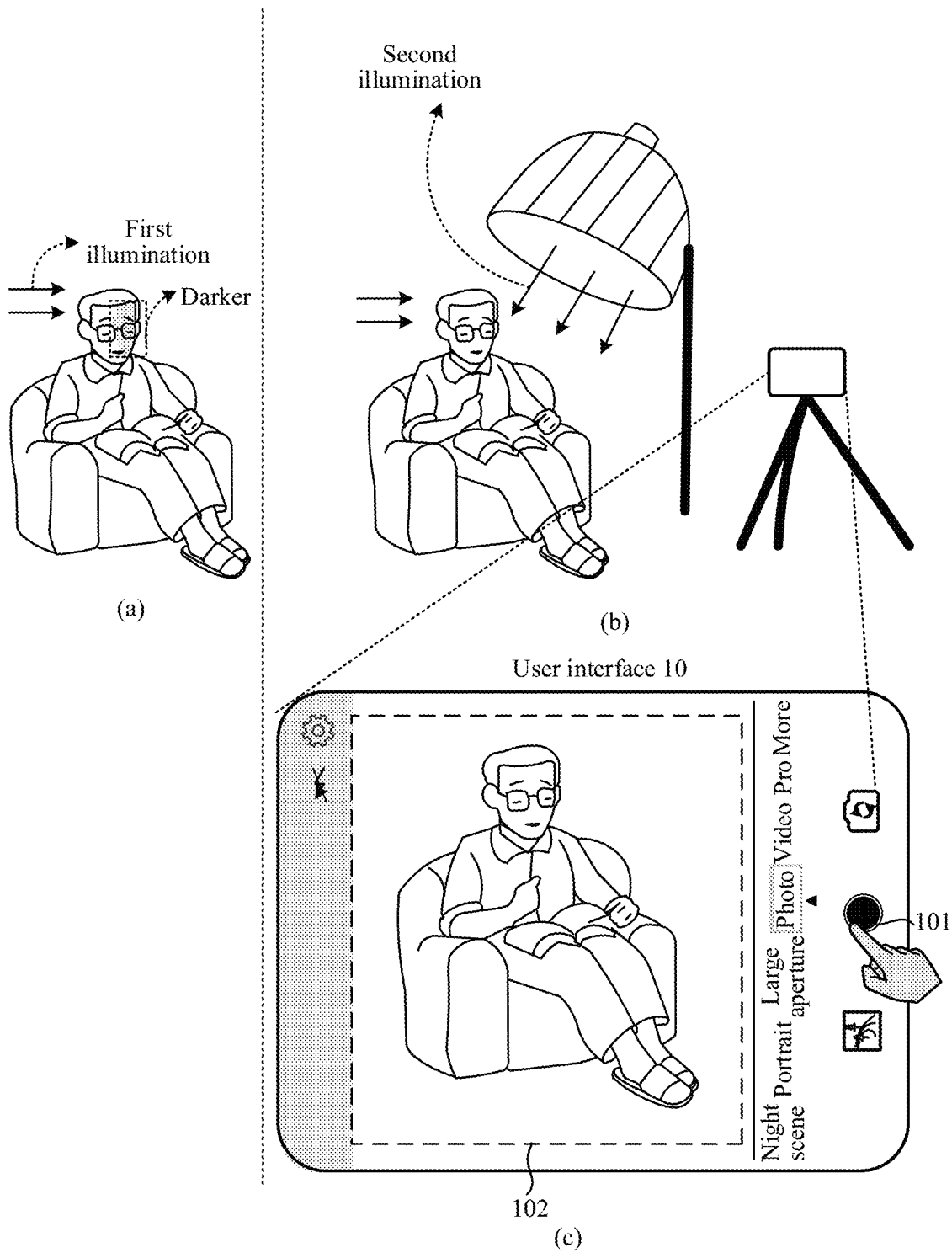
FIG. 1 shows an example in which an electronic device performs light supplementation by using an external device when the electronic device captures an image in a solution.

FIG. 1 shows an example in which an electronic device performs light supplementation by using an external device when the electronic device captures an image in a solution.

As shown in (a) of FIG. 1, first ambient light is irradiated from one side of a face of a first user to the face of the first user. However, the other side of the face lacks illumination due to occlusion, causing the face of the side to be darker. The first ambient light is light around a first portrait when the electronic device captures a first image.

In this case, as shown in (b) of FIG. 1, light supplementation may be performed on the face of the darker side by using second illumination from the external device, so that illumination on both sides of the face of the first user is even, and there is no case in which a darker side affects quality of the image. In this case, when the electronic device captures the first user, an image shown in (c) of FIG. 1 may be obtained.

As shown in (c) of FIG. 1, a user interface 10 is a capturing interface of the electronic device. In response to a click operation of a user on a capturing control 101, the electronic device may obtain an image displayed in a preview box 102. It can be seen from the image that, in this case, both sides of the face of the first user are clear and not darker, which is more in line with aesthetics of human eyes.

However, in the solution, the external device is used to perform light supplementation. When the electronic device captures an image, it is difficult for most users to perform light supplementation by using such an external device. This is because not only a professional external device but also professional light supplementation skills are required.

In this embodiment of this application, for a capturing scene in the solution, instead of using supplemented light from an external device, the electronic device first obtains a to-be-processed image, where a side of a face of a first user in the to-be-processed image lacks illumination, causing the side to be darker. Then, a first image is obtained from the to-be-processed image, where the first image is a part of the to-be-processed image that includes the face of the first user. Then, an albedo image and an illumination image of the first image are calculated, and light supplementation is performed on the first image by using the albedo image and the illumination image, to obtain a light-supplemented first image. In the light-supplemented first image, both sides of the face of the first user are clear and not darker, which is more in line with aesthetics of human eyes. Then, the electronic device replaces the first image in the to-be-processed image with the light-supplemented first image.

Figure 2:
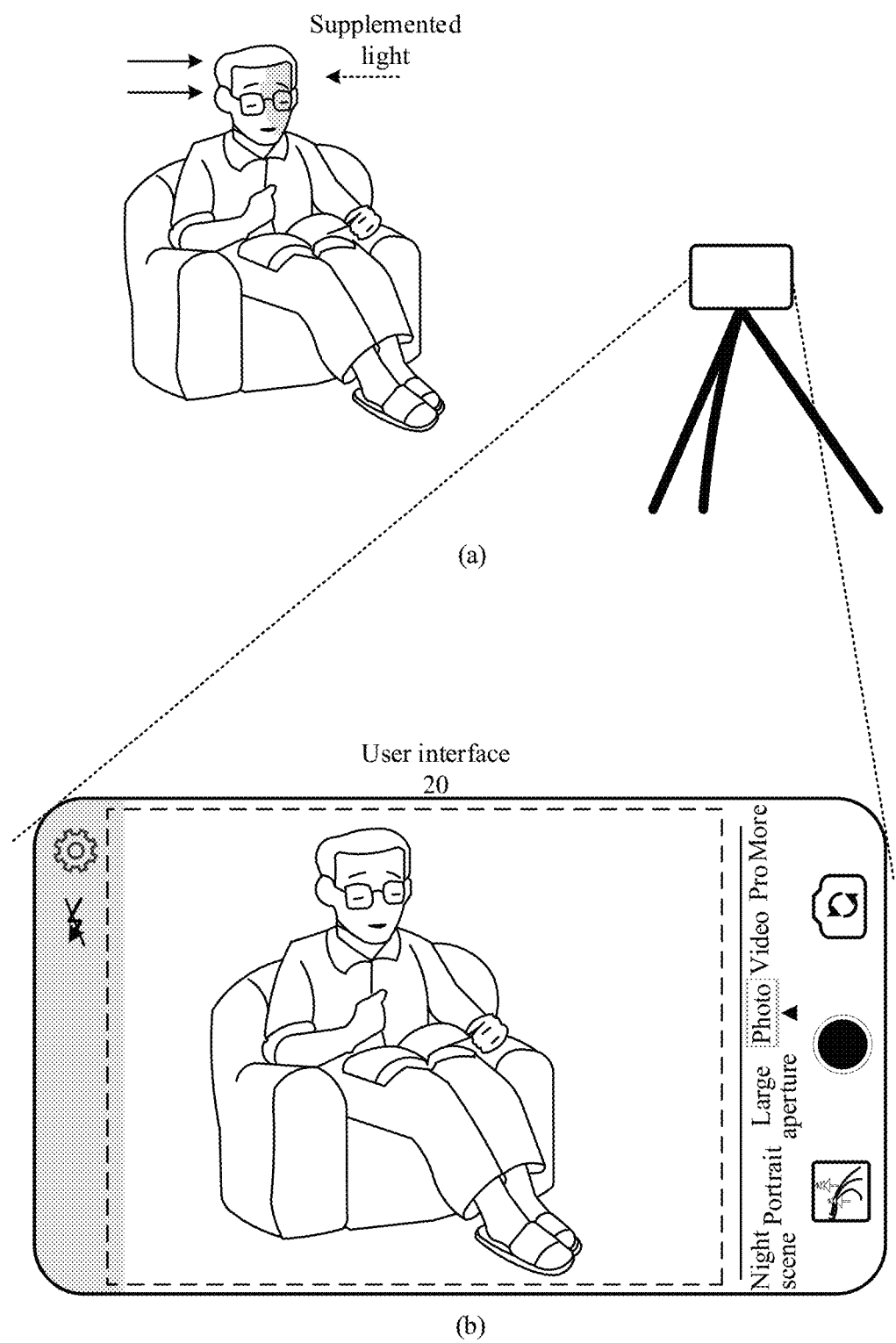
FIG. 2 shows an example when an electronic device captures an image according to an embodiment of this application.

FIG. 2 shows an example when an electronic device captures an image according to an embodiment of this application.

As shown in (a) of FIG. 2, first ambient light is irradiated from one side of a face of a first user to the face of the first user. However, the other side of the face lacks illumination due to occlusion, causing the face of the side to be darker.

In this case, the electronic device obtains a corresponding to-be-processed image (not displayed) in such a capturing scene, where a side of a face of a first user in the to-be-processed image lacks illumination, causing the side to be darker. The electronic device may perform light supplementation on the face of the first user in the to-be-processed image by using an image light supplementation method involved in an embodiment of this application. A light-supplemented to-be-processed image may be shown in (b) of FIG. 2.

As shown in (b) of FIG. 2, a user interface 20 is a preview interface of the electronic device, and a light-supplemented to-be-processed image that may be displayed in a preview box 102 is obtained. It can be seen from the image that, in this case, both sides of the face of the first user are clear and not darker, which is more in line with aesthetics of human eyes.

In this way, it is equivalent to restoring a capturing scene by the electronic device. Then, illumination of the capturing scene is optimized, and light supplementation is performed on the face of the first user in the to-be-processed image again, to improve quality of an image obtained by the electronic device.

In this embodiment of this application, the electronic device may perform light supplementation on a captured object in a to-be-processed image, to fix a first problem caused by improper illumination. The captured object may include a first captured object, for example, the captured object includes a plurality of users, and the first captured object may be a portrait of any one of the users or may be a body of any one of the users. The electronic device may first obtain a first image from the to-be-processed image, where the first image is a part of the to-be-processed image that includes the first captured object. Then, an albedo image and an illumination image of the first image are calculated, and light supplementation is performed on the first captured object in the first image by using the albedo image and the illumination image, to obtain a light-supplemented first image. Then, the electronic device replaces the first image in the to-be-processed image with the light-supplemented first image.

In the process, the illumination image is equivalent to simulating illumination corresponding to a capturing environment and re-optimizing illumination of a capturing scene, and the albedo image is for simulating an absorption degree of a captured object to the illumination. The electronic device performs light supplementation on the first captured object in the first image by using the albedo image and the illumination image, which is more in line with a physical principle compared to that the electronic device constructs a scene of capturing the first captured object under proper illumination.

In this embodiment of this application, the first image may be a portrait of a first user, or may be a body of the first user, or may be the first user (the portrait+the body), or may be another captured object. This is not limited in this embodiment of this application. The first user may be any user in the captured object. The portrait of the first user may also be referred to as a first portrait.

Based on the captured object on which the electronic device performs light supplementation, use scenes in this embodiment of this application may include the following two scenes.

In the two scenes, the captured object in the to-be-processed image is N users, where N is an integer greater than or equal to 1. The electronic device may perform light supplementation on the N users.

Scene 1: Portrait light supplementation. In a case that the captured object in the to-be-processed image includes the N users, the electronic device may perform light supplementation on portraits of the N users by using the image light supplementation method involved in this embodiment of this application.

Figure 3:
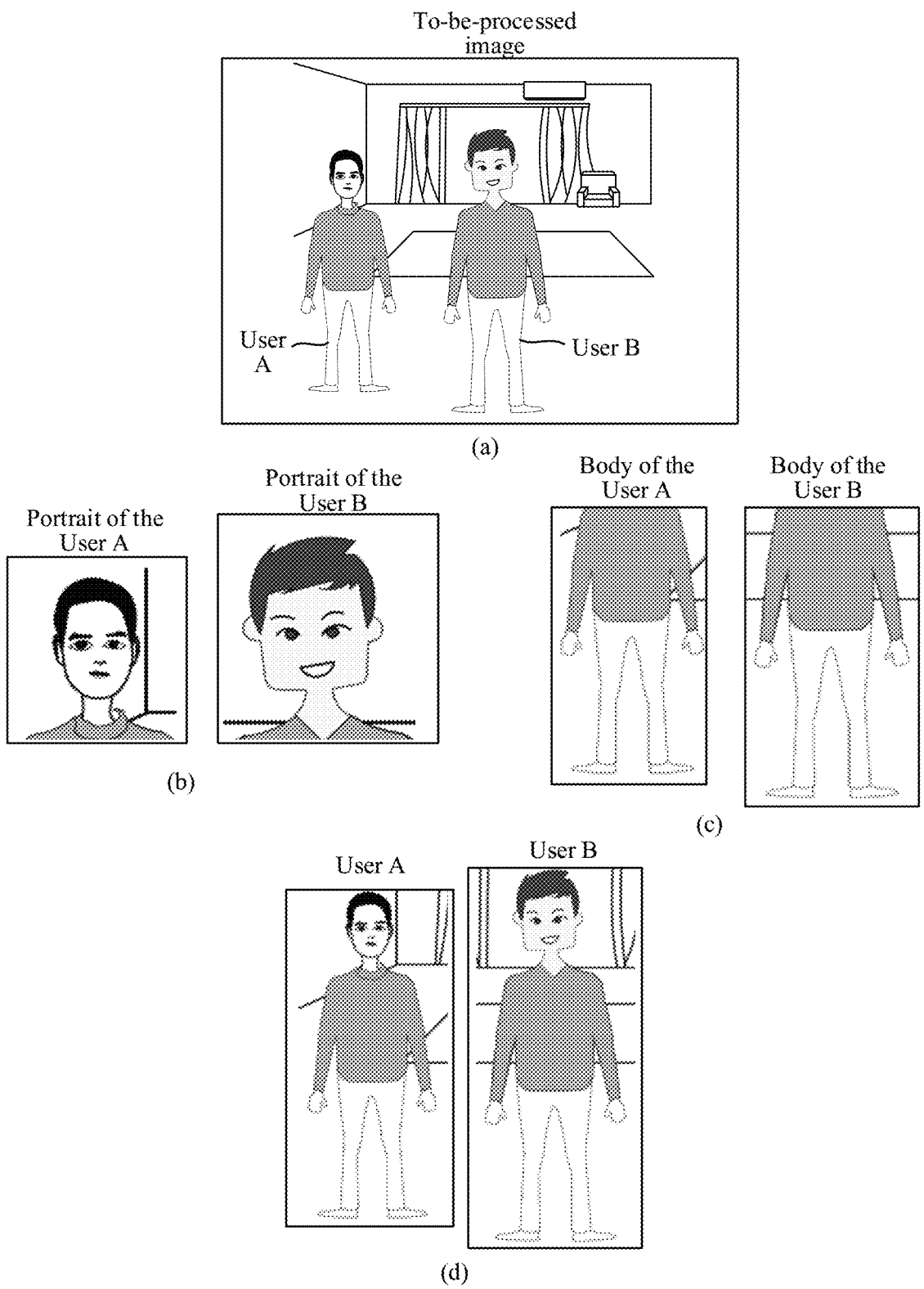
FIG. 3 shows an example when a captured object of a to-be-processed image includes two users.

FIG. 3 shows an example when a captured object of a to-be-processed image includes two users.

As shown in (a) of FIG. 3, the to-be-processed image includes a user A and a user B, and the first user may be any one of the users.

Specifically, the electronic device may obtain N images from the to-be-processed image, and any image is a portrait of any user in the N users. The first image may be any image in the N images, the first image is the portrait of the first user, and the first user is any user in the N users. When N is 1, the first user is an only user in the to-be-processed image. Then, the electronic device may perform light supplementation on the portrait of the first user in the first image by using the image light supplementation method in this embodiment of this application. The electronic device replaces the first image in the to-be-processed image with a light-supplemented first image.

For example, as shown in (b) of FIG. 3, in this case, the electronic device obtains, from the to-be-processed image, two images: a portrait of the user A and a portrait of the user B respectively. The first image may be any of the images.

Scene 2: Portrait and body light supplementation. In a case that the captured object in the to-be-processed image includes the N users, the electronic device may perform light supplementation on portraits and bodies of the N users by using the image light supplementation method involved in this embodiment of this application.

In some embodiments, the electronic device may perform light supplementation on a portrait of a user and a body of the user in the to-be-processed image respectively.

For the portrait of the user and a process in which the electronic device performs light supplementation on a face of the user, refer to the description of Scene 1.

For the body of the user, the electronic device may obtain N images from the to-be-processed image, and any image is a body of any user in the N users. Any image in the N images is referred to as a second image, the second image is the body of the first user, and the first user is any user in the N users. When N is 1, the first user is an only user in the to-be-processed image. Then, the electronic device may perform light supplementation on the body of the first user in the second image by using the image light supplementation method in this embodiment of this application. The electronic device replaces the first image in the to-be-processed image with a light-supplemented first image.

For example, as shown in (c) of FIG. 3, in this case, the electronic device obtains, from the to-be-processed image, two images: a body of the user A and a body of the user B respectively. The first image may be any of the images.

In some other embodiments, the electronic device may perform light supplementation on a portrait of a user and a body of the user in the to-be-processed image simultaneously.

Specifically, the electronic device may obtain N images from the to-be-processed image, and any image is any user (where a portrait+a body=a user) in the N users. The first image may be any image in the N images, the first image is the first user, and the first user is any user in the N users. When N is 1, the first user is an only user in the to-be-processed image. Then, the electronic device may perform light supplementation on the first user in the first image by using the image light supplementation method in this embodiment of this application. The electronic device replaces the first image in the to-be-processed image with a light-supplemented first image.

For example, as shown in (d) of FIG. 3, in this case, the electronic device obtains, from the to-be-processed image, two images: the user A and the user B respectively. The first image may be any of the images.

A process in which the electronic device performs light supplementation on a portrait of a user in the to-be-processed image in Scene 1 is described below.

In Scene 1, the to-be-processed image includes the N users, where N is greater than or equal to 1. The electronic device may perform light supplementation on a portrait of any of the users by using the image light supplementation method in this embodiment of this application.

An example in which the electronic device performs light supplementation on the portrait of the first user is used for detailed description. For a portrait of another user, refer to the description of performing light supplementation on the portrait of the first user.

Figure 4:
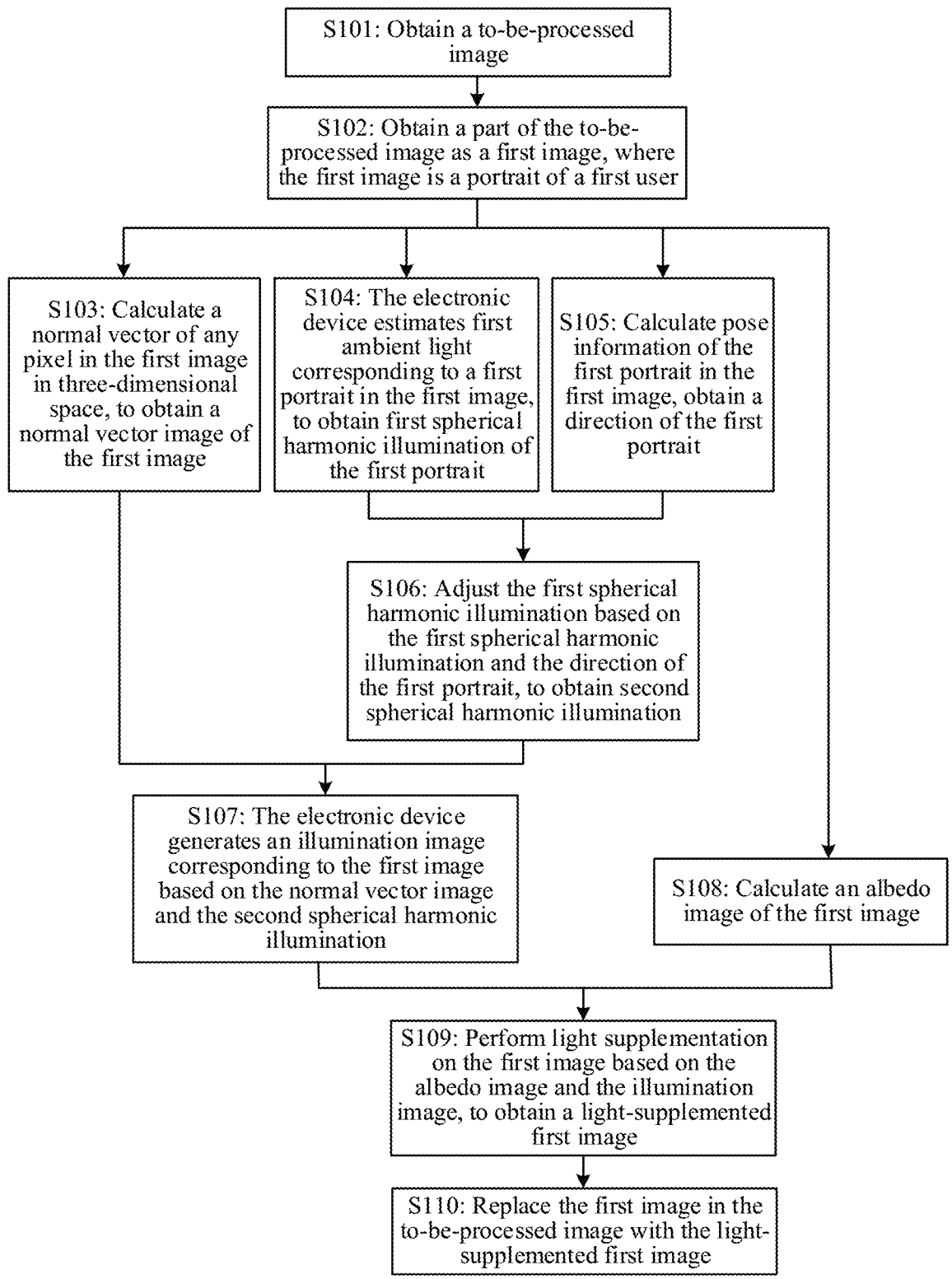
FIG. 4 is a schematic flowchart in which an electronic device performs light supplementation on a portrait of a first user.

FIG. 4 is a schematic flowchart in which an electronic device performs light supplementation on a portrait of a first user.

Figure 5:
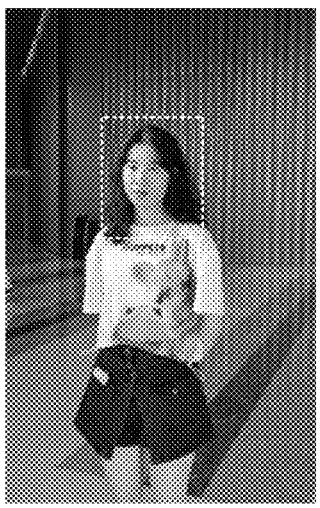
FIG. 5 is a schematic diagram of various images involved when an electronic device performs light supplementation on a portrait of a first user.
Figure 5:
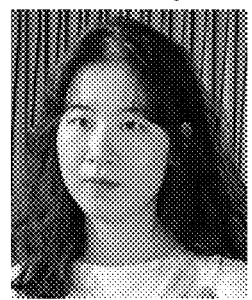
Figure 5:
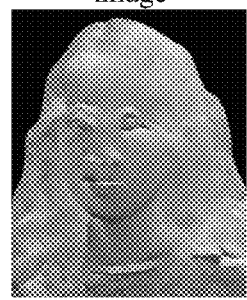
Figure 5:
Figure 5:
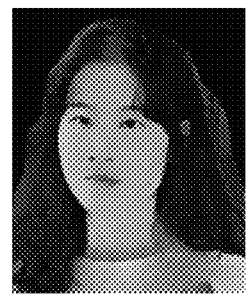
Figure 5:
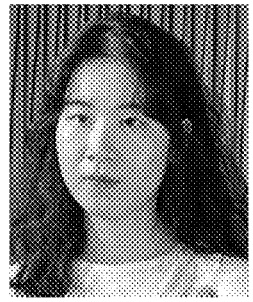

FIG. 5 is a schematic diagram of various images involved when an electronic device performs light supplementation on a portrait of a first user.

For a process in which the electronic device performs light supplementation on the portrait of the first user in the to-be-processed image, refer to description of step S101 to step S110.

S101: An electronic device obtains a to-be-processed image.

The to-be-processed image includes a first target object, where the first target object may be a portrait of a first user or other content.

During capturing, a light signal reflected by a captured object is transmitted to an image sensor of a camera through a lens, the image sensor converts the light signal into an electrical signal, the image sensor transmits the electrical signal to an ISP, and the ISP converts the electrical signal into a corresponding to-be-processed image. (a) of FIG. 5 is a schematic diagram of the to-be-processed image.

In some other embodiments, the to-be-processed image may be indicated by a matrix in the electronic device, or may be indicated by an array, or may be indicated in another form, as long as it is data that can be recognized by the electronic device. This is not limited in this embodiment of this application.

It should be understood that, in addition to being an image corresponding to an RGB space, the to-be-processed image may also be an image corresponding to another color space such as a YUV space.

A process in which the electronic device performs light supplementation on the to-be-processed image is also a process of adjusting a value of an element in the matrix.

S102: The electronic device obtains a part of the to-be-processed image as a first image, where the first image is the portrait of the first user.

In a possible implementation, the electronic device may obtain the portrait of the first user by using a face recognition algorithm.

The portrait of the first user may be a face region of the first user. The face region includes at least a face, and may also include a part region around the face, for example, a neck. (b) of FIG. 5 is a schematic diagram of the first image, and the first image is an image in a dashed box shown in (a) of FIG. 5.

Specifically, after the electronic device detects the face of the first user in the to-be-processed image and positions a face key feature point, the face region of the first user may be cut out, and the electronic device may use the main face region as the portrait of the first user.

In some embodiments, the first image may be an image corresponding to the RGB space. In this case, the electronic device may indicate the first image by using a matrix. Each element in the matrix corresponds to a pixel in the image. Each element in the matrix is a triplet. When a bit depth of the pixel is 8 bits, any value in the triplet is valued as 0 to 255. The value may indicate, in first ambient light, a brightness value of any pixel in the first image on a red (red) channel/a green (green) channel/a blue (blue) channel. Such three brightness values are for describing a color of any pixel, for example, an element (255, 255, 255) indicates that the corresponding pixel is white. It should be understood that, in addition to being 8 bits, the bit depth of the foregoing pixel may also be another value, for example, 10 bits. In this case, any value in the triplet is valued as 0 to 1023, which may indicate more precise color brightness. An example in which the bit depth is 8 bits is used in this application, and should not constitute a limitation on this application.

S103: The electronic device calculates a normal vector of any pixel in the first image in three-dimensional space, to obtain a normal vector image of the first image.

The normal vector image is an image obtained based on a normal vector feature of the to-be-processed image, and may be specifically obtained based on a normal vector feature of the first image.

The normal vector feature may be a normal vector of any pixel in the image, and the normal vector is a three-dimensional vector perpendicular to a tangent plane of the pixel in a curved surface in which the pixel is located after the portrait of the first user in the first image is converted into the three-dimensional space. A direction of the normal vector of the pixel is a direction of the pixel. In a case that a direction and light intensity of illumination are known, light supplementation information of the pixel may be determined based on the direction of the pixel. (c) of FIG. 5 is a schematic diagram of the normal vector image.

The light supplementation information refers to illumination that needs to be supplemented when a color of the pixel is normal, which includes a direction and intensity of the illumination.

The electronic device may calculate normal vectors of all pixels in the first image in the three-dimensional space, to obtain a normal vector image of the first image. The normal vector image records normal vector information of any pixel in the first image, and may be for describing three-dimensional information of the portrait of the first user in the first image and determining light supplementation information of the portrait of the first user.

The light supplementation information of the portrait of the first user refers to illumination that needs to be supplemented when a color of a first portrait is normal, which includes a direction and intensity of the illumination.

When the electronic device captures the first portrait, if light intensity and a direction of the first ambient light are different, quality of an image obtained when the electronic device captures the first portrait may be affected. For example, if the first ambient light is irradiated from a left face of the first user, light rays on a right face are darker. In this way, in the image, brightness of the left face and brightness of the right face are different, affecting the quality of the image.

It may be understood that, in a case that light intensity and a direction of the illumination are known, light supplementation information of the pixel may be determined based on a direction of a normal vector of the pixel. The light supplementation information of the pixel refers to illumination that needs to be supplemented when a color of the pixel is normal, which includes a direction and intensity of the illumination. For example, when an angle between a direction of any pixel and a direction of the first ambient light is larger, light intensity corresponding to the pixel is smaller, and a color of the pixel during imaging is darker. In this case, light intensity in light supplementation information corresponding to the pixel is to be larger, and an angle between the direction of the illumination and the direction of the pixel is to be smaller.

In some embodiments, the electronic device may establish a camera coordinate system in the three-dimensional space, the electronic device may convert the portrait of the first user in the first image into the camera coordinate system, and a direction of a normal vector of any pixel points to an origin of the camera coordinate system from a point of the camera coordinate system.

The origin of the camera coordinate system is a center of a camera of the electronic device. An X axis is established in a horizontal direction, a Y axis is established in a vertical direction, and a Z axis is established in a direction perpendicular to a plane XOY. The plane XOY is parallel to a display screen of the electronic device.

Figure 6:
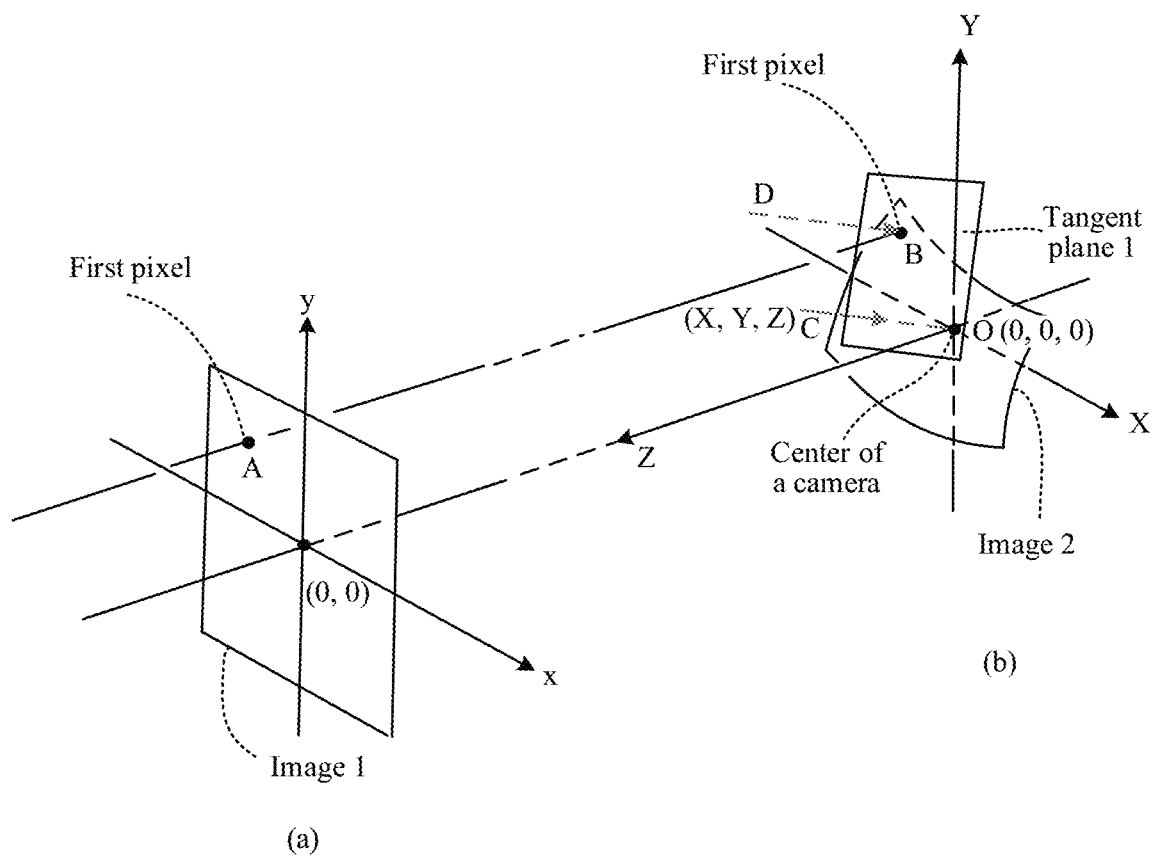
FIG. 6 is a schematic diagram of a normal vector that indicates a pixel in a first image in a camera coordinate system.

FIG. 6 is a schematic diagram of a normal vector that indicates a pixel in a first image in a camera coordinate system.

As shown in FIG. 6, the first image may be converted into the camera coordinate system. As shown in (a) of FIG. 6, an image 1 in an image coordinate system is the first image. In the image coordinate system, a center of the image is an origin, an x axis may be a length of the image, and a y axis may be a height of the image. As shown in (b) of FIG. 6, an image 2 is the first image in the camera coordinate system. A point A in the image 1 is a first pixel, and after being converted into the camera coordinate system, the first pixel corresponds to a point B. In this case, the image 2 is a curved surface in which the first pixel is located, and a tangent plane of the first pixel is a tangent plane 1. A normal vector perpendicular to the tangent plane 1 is $\overrightarrow{BD}$, and a direction of the normal vector is that a start point, namely, the point B, points to an end point, namely, a point D. For ease of indication, the normal vector $\overrightarrow{BD}$ may be translated, so that the start point, namely, the point B coincides with an origin O of coordinates, to obtain a normal vector $\overrightarrow{OC}$. A direction of the normal vector $\overrightarrow{OC}$ is that a start point, namely, the point O, points to an end point, namely, a point C, which is the same as a direction indicated by the normal vector $\overrightarrow{BD}$. In this case, the electronic device may replace the normal vector $\overrightarrow{BD}$ with the normal vector $\overrightarrow{OC}$, and the electronic device may indicate the normal vector $\overrightarrow{OC}$ by using coordinates (X, Y, Z) of the point C.

It may be understood that, in addition to the camera coordinate system, another coordinate system such as a world coordinate system may also be referred to. This is not limited in this embodiment of this application.

The electronic device may indicate the normal vector image by using a matrix. Each element in the matrix corresponds to a normal vector of a pixel in the image. The element is a triplet, and any value in the triplet indicates a distance of a normal vector of a start point on the origin relative to the X axis, the Y axis, or the Z axis in the camera coordinate system. For example, a triplet that corresponds to the normal vector $\overrightarrow{OC}$ corresponding to the first pixel in FIG. 6 and that is the matrix may be indicated as (X, Y, Z).

In a possible implementation, the electronic device may calculate, based on the first image, the normal vector image of the first image through a first U-Net network, where the first U-Net network may include a first residual module configured to extract the normal vector feature.

Specifically, the electronic device first extracts an image feature in the first image, to obtain a feature map. Then, the electronic device extracts, by using the first residual module, the normal vector feature of the first image by using the feature map. First convolution is performed on the normal vector feature to obtain the normal vector image. The image feature is for describing information such as a color feature and a texture feature of the first image.

It should be understood that, in addition to the first U-Net network, another algorithm may also be used to obtain the normal vector image. This is not limited in this embodiment of this application.

S104: The electronic device estimates the first ambient light corresponding to the first portrait in the first image, to obtain first spherical harmonic illumination of the first portrait.

The first ambient light is light around the first portrait when the electronic device captures the first image.

The first spherical harmonic illumination is M first spherical harmonic illumination coefficients corresponding to the red channel/the green channel/the blue channel respectively. The electronic device may indicate the light intensity and the direction of the first ambient light by using M×3 first spherical harmonic illumination coefficients. M first spherical harmonic illumination coefficients corresponding to any channel may indicate a component of the first ambient light on the channel, where the component includes components of the light intensity and the direction of the first ambient light. M may be valued as 9, or may be another value. This is not limited in this embodiment of this application.

In some embodiments, the electronic device may indicate the first spherical harmonic illumination by using a matrix. The matrix has M×3 elements, where 3 indicates the red channel/the green channel/the blue channel, and M indicates the M first spherical harmonic illumination coefficients corresponding to any channel. The first spherical harmonic illumination may also be indicated in another manner, for example, an array. This is not limited in this embodiment of this application.

The electronic device may estimate the first ambient light corresponding to the first portrait in the first image by using a spherical harmonics, to obtain the first spherical harmonic illumination of the first portrait, and indicate the first ambient light by using the first spherical harmonic illumination.

Light intensity of illumination refers to lighting intensity of light rays in a given direction (where radiation intensity in the direction is 1/683 watts/steradian), which is measured by candela (candela), cd for short.

A direction of the illumination refers to a propagation direction of the light rays. For ease of description, the direction of the illumination may be described in a same reference coordinate system together with the direction of the normal vector in step S103, for example, the camera coordinate system.

The first spherical harmonic illumination may be mapped to a first ambient light image, where the first ambient light image may indicate, in the first ambient light, light intensity and a direction of illumination corresponding to any point on a spherical surface around the first portrait. To be specific, the electronic device may describe the illumination around the first portrait by using the first spherical harmonic illumination.

The first ambient light image has two forms: a first form and a second form. Refer to the following description of FIG. 7.

It should be understood that, the first ambient light image in the first form and the first ambient light image in the second form are essentially the same, and may only correspond to the first spherical harmonic illumination. The first spherical harmonic illumination may be mapped to the first ambient light image in the first form and the first ambient light image in the second form. The electronic device may also obtain a first spherical harmonic illumination coefficient by using mapping of the first ambient light image in the first form and the first ambient light image in the second form.

Light intensity of any point is decided by brightness of the point in the first ambient light image. An illumination direction of any point is that the point points to a spherical center.

The electronic device may indicate the first ambient light image in the first form or the second form by using a matrix. The matrix has X elements, where any element may indicate a point in space around the first portrait in the first ambient light. Any element is a triplet, any value in the triplet indicates a pitch angle, a yaw angle, or brightness of the point in the first ambient light image, and a value range corresponding to the brightness is (0 to 255).

In some embodiments, the electronic device may calculate, based on the first image, the first spherical harmonic illumination of the first image through a VGG network.

Specifically, the electronic device first extracts an image feature in the first image, to obtain a feature map of the first image. Then, the normal vector feature and an albedo feature of the first image are extracted by using the feature map. Then, the electronic device obtains the first spherical harmonic illumination by using the image feature, the normal vector feature, and the albedo feature.

The albedo feature is for reflecting an absorption situation of a pixel in the image to illumination, and may be for solving an albedo image of the image and describing an acceptance degree of any pixel in the image to light intensity.

It should be understood that, in addition to the VGG network, another algorithm may also be used to obtain the first spherical harmonic illumination. This is not limited in this embodiment of this application.

In some embodiments, the electronic device may map the first spherical harmonic illumination to the first ambient light image, where a used algorithm may be a spherical harmonics (spherical harmonics).

Figure 7:
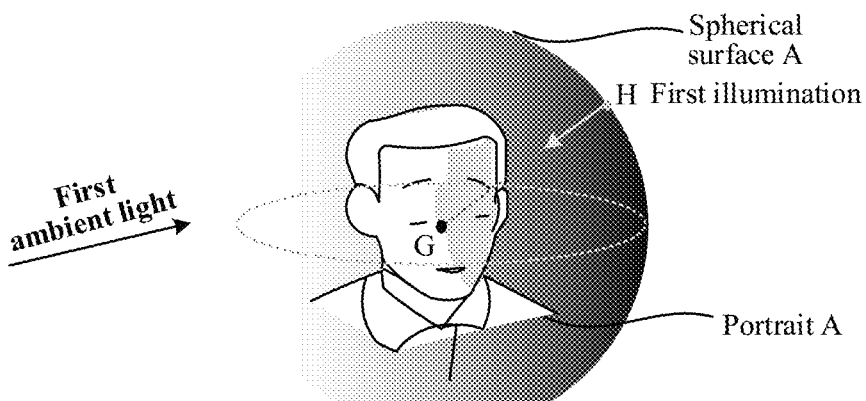
FIG. 7 is a schematic diagram of a first ambient light image in different forms.
Figure 7:
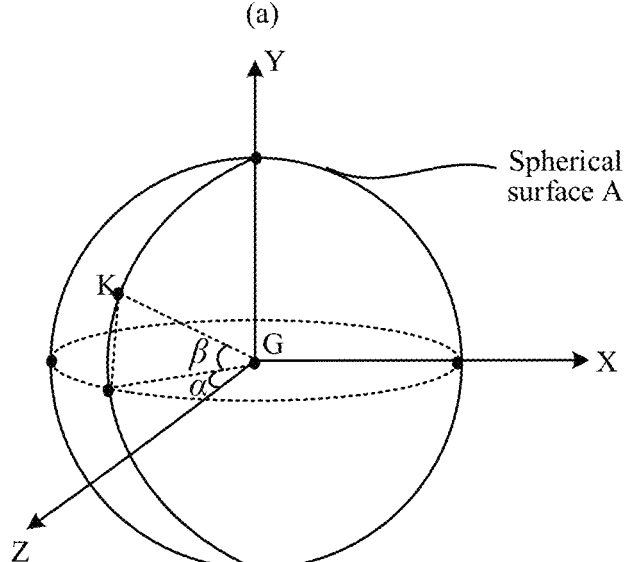
Figure 7:
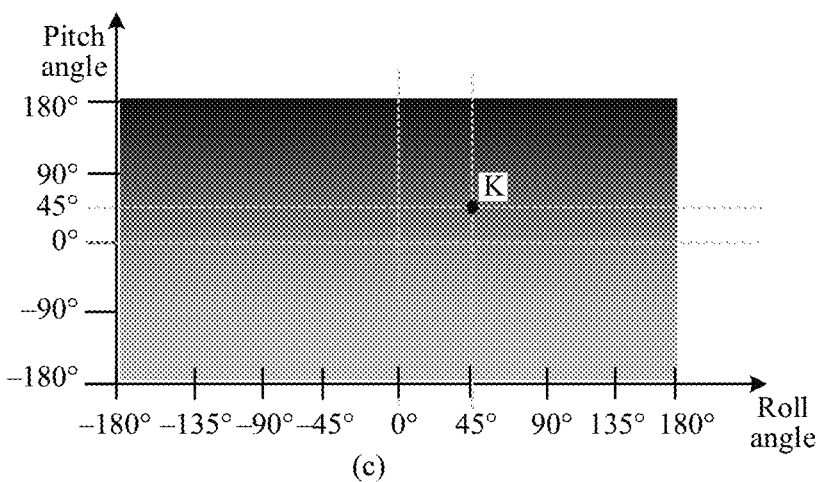

FIG. 7 is a schematic diagram of a first ambient light image in different forms.

(a) of FIG. 7 is a first form of the first ambient light image. By expanding the first ambient light image, a second form of the first ambient light image shown in (c) of FIG. 7 may be obtained. (b) of FIG. 7 displays a relationship between the two.

As shown in (a) of FIG. 7, the first ambient light image describes light intensity and a direction of any point on a spherical surface, where the spherical surface includes a first portrait. For example, the first portrait may be a portrait A, and the spherical surface may be a spherical surface A. Any point in space around the portrait A may be any point on the spherical surface A. For example, for a point H on the spherical surface A, an illumination direction of the point H is that the point points to a spherical center G. Light intensity corresponding to the point H is brightness corresponding to the point on the spherical surface. Darker brightness indicates smaller light intensity, and brighter brightness indicates larger light intensity.

In a possible implementation, the electronic device may convert the spherical surface A into a spherical coordinate system, and indicate a direction of any point on the spherical surface A in the spherical coordinate system. For ease of indication, the spherical coordinate system may correspond to the foregoing camera coordinate system. A spherical center of the spherical coordinate system is the origin of the camera coordinate system, and an X axis, a Y axis, and a Z axis of the spherical coordinate system are the X axis, the axis, and the Z axis of the camera coordinate system. The electronic device may determine a direction of any point by using a pitch (pitch) angle and a yaw (yaw) angle of any point relative to the spherical coordinate system.

As shown in (b) of FIG. 7, a pitch angle of any point indicates a rotation angle of the point around X, where a range of the pitch angle is −180° to 180°. A yaw angle of any point indicates a rotation angle of the point around Y, where a range of the yaw angle is −180° to 180°. For example, a pitch angle corresponding to a point K is β, and a yaw angle corresponding to the point K is α. The electronic device may indicate a direction of the point K relative to the spherical surface by using (α, β).

It should be understood that, in addition to an indication method in (b) of FIG. 7, another manner is also used to indicate any point on the spherical surface. For example, refer to an earth latitude and longitude description method. This is not limited in this embodiment of this application.

Refer to description in (b) of FIG. 7. By expanding the first ambient light image in (a) of FIG. 7, the second form of the first ambient light image shown in (c) of FIG. 7 is obtained. In this case, in the first ambient light image, brightness corresponding to any point indicates light intensity of the point. Any point in the first ambient light image in the first form may be mapped to the first ambient light image in the second form. For example, in (a) of FIG. 7, for the point K in the first ambient light image in the first form, if the corresponding yaw angle is α and is 45°, and the pitch angle is β and is 45°, the point K corresponds to a point K in (c) of FIG. 7 in the first ambient light image in the second form.

The first ambient light image described below refers to the first ambient light image in the second form.

It may be understood that, the electronic device may further determine, by mapping the first spherical harmonic illumination to the first ambient light image, the direction and the light intensity of the first ambient light in the first ambient light image. Specifically, the electronic device may determine a direction corresponding to a brightest point in the first ambient light image as the direction of the first ambient light, where brightness of the point is the light intensity of the first ambient light. In a case that a direction of the first portrait and the direction and the light intensity of the first ambient light are determined, the electronic device may determine light supplementation information of the first portrait.

The brightest point in this embodiment of this application may also be referred to as an ambient light point.

For a process of determining the direction of the first portrait, refer to description of step S105. For a process of determining the light supplementation information of the first portrait, refer to description of step S106.

S105: The electronic device calculates pose information of the first portrait in the first image, to obtain the direction of the first portrait.

The pose information of the first portrait includes at least one of a pitch (pitch) angle, a yaw (yaw) angle, and a roll (roll) angle of the first portrait.

A reference coordinate system of the pitch angle, the yaw angle, and the roll angle is the foregoing camera coordinate system. In this case, the pitch angle indicates a rotation angle of the first portrait around the X axis, the yaw angle indicates a rotation angle of the first portrait around the Y axis, and the roll angle indicates a rotation angle of the first portrait around the Z axis.

In some embodiments, the direction of the first portrait may also be calculated by using at least one of the pose information such as the pitch angle, the yaw angle, and the roll angle of the first portrait, for example, using the pitch angle, the yaw angle, and the roll angle.

The direction of the first portrait may be for describing an orientation of a face of the first portrait, and the direction of the first portrait is relative to a direction of a three-dimensional standard portrait. The three-dimensional standard portrait directly faces a camera center of the electronic device, and a pitch angle thereof in the camera coordinate system is 0°, a yaw angle is 0°, and a roll angle is 0°.

The electronic device may obtain the direction of the first portrait by using the pose information of the first portrait, where the direction of the first portrait may be a direction when a point on the spherical surface in the foregoing spherical coordinate system points to the spherical center.

The electronic device may determine face key point information of the first portrait, calculate a rotation vector of the first portrait based on the face key point information, then convert the rotation vector into a rotation matrix, and calculate the pose information of the first portrait through the rotation matrix.

Specifically, the electronic device first determines N pieces of face key point information of the first portrait, where N is an integer greater than or equal to 1, and the N pieces of face key point information are relative to coordinates in an image coordinate system. For description of the image coordinate system, refer to the related description of (a) of FIG. 6.

Then, the electronic device obtains N pieces of face key point information of the three-dimensional standard portrait in a world coordinate system, where N face key points of the three-dimensional standard portrait are key points with same physiological features as N face key points of the first portrait. For example, if the N face key points of the first portrait are a left eye corner, a right eye corner, a center of a nose tip, a left mouth corner, a right mouth corner, and a center of a jaw, the N face key points of the three-dimensional standard portrait are also the left eye corner, the right eye corner, the center of the nose tip, the left mouth corner, the right mouth corner, and the center of the jaw. The electronic device may convert coordinate information of the face key points relative to the world coordinate system into an image coordinate system, then determine a rotation vector based on coordinates of the face key points of the three-dimensional standard portrait and coordinates of the face key points of the first portrait in the image coordinate system, then convert the rotation vector into a rotation matrix, and calculate the pose information of the first portrait through the rotation matrix.

For formulas in a process in which the electronic device determines the rotation vector, refer to the following formulas:

$$R, t = \underset{R,t}{\operatorname{argmin}} \sum_{x,y,x',y'} \|(x, y) - (x', y')\| \quad \text{(Formula 1)}$$

$$\begin{bmatrix} x \\ y \\ 1 \end{bmatrix} = sA \left\{ R \begin{bmatrix} U \\ V \\ W \end{bmatrix} + t \right\} \quad \text{(Formula 2)}$$

In Formula (1), (x,y) indicates coordinates of a face key point of any three-dimensional standard portrait in the image coordinate system; (x', y') indicates coordinates of a face key point of any first portrait in the image coordinate system; and argmin indicates that a rotation vector R and a translation vector t are obtained by minimizing an error between the face key point (x,y) of the three-dimensional standard portrait and the face key point (x', y') of the first portrait that is mapped to the image coordinate system. In Formula (2), s is a magnification coefficient, A is an internal reference matrix of the camera of the electronic device, R is the rotation vector, t is the translation vector, $[U \ V \ W]^T$ is coordinates of a face key point of a three-dimensional standard portrait in the world coordinate system, and $[xy \ 1]^T$ is coordinates of the face key point of the three-dimensional standard portrait in the image coordinate system.

Then, for a process in which the electronic device converts the rotation vector into a rotation matrix and calculates the pose information of the first portrait through the rotation matrix, refer to the following formulas:

$$R_m = \cos(norm(R)) + \\ (1 - \cos(norm(R)))RR^T + \sin(norm(R)) \begin{bmatrix} 0 & -R_Z & R_y \\ R_z & 0 & -R_x \\ -R_y & R_x & 0 \end{bmatrix} \quad \text{(Formula 3)}$$

$$\begin{bmatrix} \text{pitch} \\ \text{yaw} \\ \text{roll} \end{bmatrix} = \begin{bmatrix} \tan^{-1} \frac{2(Q_0 Q_1 - Q_2 Q_3)}{(Q_0^2 - Q_1^2) - (Q_2^2 - Q_3^2)} \\ \sin^{-1}(2(Q_0 Q_2 + Q_1 Q_3)) \\ \tan^{-1} \frac{2(Q_0 Q_3 - Q_1 Q_2)}{(Q_0^2 + Q_1^2) - (Q_2^2 + Q_3^2)} \end{bmatrix} \quad \text{(Formula 4)}$$

In Formula (3), $R_m$ indicates the rotation matrix, norm(R) indicates to perform normalization on the rotation vector R, $R_x$ indicates a component of the rotation vector R on the X axis of the camera coordinate system, $R_y$ indicates a component of the rotation vector R on the Y axis of the camera coordinate system, and $R_z$ indicates a component of the rotation vector R on the Z axis of the camera coordinate system. In Formula (4), pitch indicates a pitch angle, yaw indicates a yaw angle, and roll indicates a roll angle.

$$Q_0 = \frac{\sqrt{1 + R_m(1, 1) + R_m(2, 2) + R_m(3, 3)}}{2}, Q_1 = \frac{R_m(3, 2) - R_m(2, 3)}{4Q_0},$$

$$Q_2 = \frac{R_m(1, 3) - R_m(3, 1)}{4Q_0}, \text{ and } Q_3 = \frac{R_m(2, 1) - R_m(1, 2)}{4Q_0},$$

where $R_m(i,j)$ indicates an element corresponding to an $i^{th}$ row and a $j^{th}$ column in the rotation matrix. For example, $R_m(1,1)$ indicates an element corresponding to a first row and a first column in the rotation matrix.

Then, the electronic device may calculate the direction of the first portrait based on the pitch angle and the yaw angle of the first portrait.

$$\vec{A} = [\cos(a) \times \sin(b), \cos(a) \times \cos(b), \sin(b)] \quad \text{(Formula 5)}$$

In Formula (5), a vector $\vec{A}$ indicates the direction of the first portrait; a is the pitch angle of the first portrait; and b is the yaw angle of the first portrait.

S106: The electronic device adjusts the first spherical harmonic illumination based on the first spherical harmonic illumination and the direction of the first portrait, to obtain second spherical harmonic illumination.

The second spherical harmonic illumination may indicate light intensity and a direction of second ambient light.

The second ambient light is light around the first portrait after light supplementation is performed on the first ambient light, namely, light obtained supplemented light plus the first ambient light.

For an indication manner of the second spherical harmonic illumination, refer to the description of the first spherical harmonic illumination. The electronic device may indicate the light intensity and the direction of the second ambient light by using M×3 second spherical harmonic illumination coefficients.

The electronic device may determine the light intensity and the direction of the first ambient light based on the first spherical harmonic illumination; then determine, based on the direction of the first portrait and a light supplementation principle, light intensity and a direction of supplemented light; then adjust the first ambient light image corresponding to the first spherical harmonic illumination by using the light intensity and the direction of the supplemented light, to obtain a second ambient light image; and finally obtain the second spherical harmonic illumination by using the second ambient light image.

There may be N light supplementation principles, where N is an integer greater than or equal to 1. The electronic device may determine, based on the light intensity and the direction of the first ambient light, that at least one light supplementation principle is for image light supplementation; or may determine, based on a user setting, that at least one light supplementation principle is for image light supplementation; or may determine, based on another manner, one or more light supplementation principles for image light supplementation from the N light supplementation principles. This is not limited in this embodiment of this application.

The light intensity of the first ambient light may be determined by the electronic device by using the first spherical harmonic illumination in step S104, or may be light intensity of ambient light determined by an ambient light sensor when obtaining the to-be-processed image.

The light supplementation principle in this embodiment of this application may be one or more of positive light supplementation, negative light supplementation, rimming light, Rembrandt light, light splitting, and the like. For detailed description of the light supplementation principle, refer to description of step S202. Details are not described herein.

Figure 8:
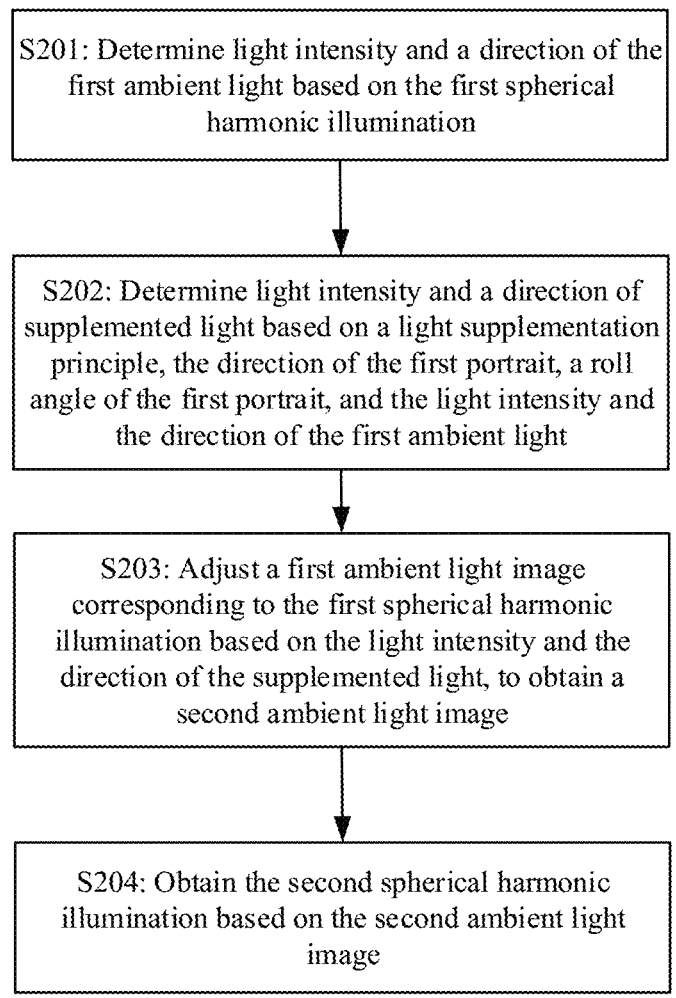
FIG. 8 is a schematic flowchart in which an electronic device obtains second spherical harmonic illumination.

FIG. 8 is a schematic flowchart in which an electronic device obtains second spherical harmonic illumination.

Figure 9:
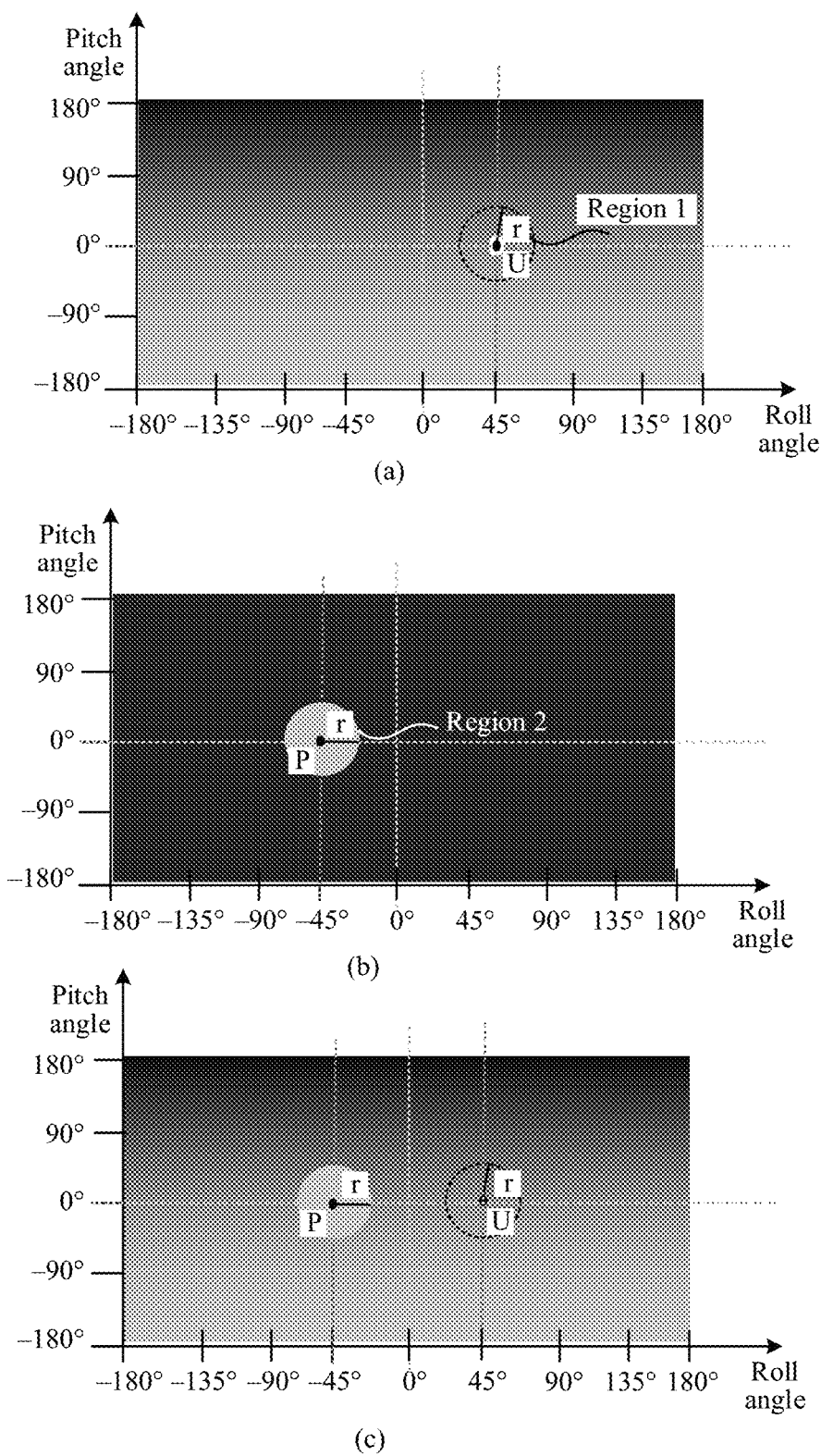
FIG. 9 is a schematic diagram in which an electronic device obtains second spherical harmonic illumination.

FIG. 9 is a schematic diagram in which an electronic device obtains second spherical harmonic illumination.

For the electronic device obtaining the second spherical harmonic illumination, refer to description of step S201 to step S204.

Step S201 to step S204 are described in detail below with reference to FIG. 9.

S201: The electronic device determines the light intensity and the direction of the first ambient light based on the first spherical harmonic illumination.

The electronic device maps the first spherical harmonic illumination to the first ambient light image, and determines a direction corresponding to a brightest point in the first ambient light image as the direction of the first ambient light, where brightness of the point is the light intensity of the first ambient light.

(a) of FIG. 9 shows the first ambient light image corresponding to the first spherical harmonic illumination. The electronic device may determine a point with a largest value of brightness (namely, a brightest point) in the first ambient light image is a point U. In this case, the electronic device may determine a direction of the point U and the brightness of the point U as the direction and the light intensity of the first ambient light.

S202: The electronic device determines light intensity and a direction of supplemented light based on a light supplementation principle, the direction of the first portrait, the roll angle of the first portrait, and the light intensity and the direction of the first ambient light.

In some embodiments, the light supplementation principle may be one or more of positive light supplementation, negative light supplementation, rimming light, Rembrandt light, light splitting, and the like.

The positive light supplementation is for filling a shadow region caused by the first ambient light on a subject (for example, a face or a portrait), so that the shadow region can be brighten. Generally, the light intensity of the supplemented light is lower than the light intensity of the first ambient light. A purpose of this is to make the subject in the shadow region more prominent without creating additional shadows. The principle stipulates that there is a better effect when a light intensity ratio of the first ambient light to the supplemented light is about 2:1, and light supplementation information is generated based on the principle. A common situation of the positive light supplementation is: The light supplementation is performed symmetrically on the face, in other words, the first ambient light and the supplemented light are symmetrical relative to the face, for example, as shown in (a) of FIG. 2. For detailed description of the positive light supplementation, refer to the following description of FIG. 10a.

In the negative light supplementation, the supplemented light is often for strengthening light rays of a non-shadow region. A purpose of this is to strengthen chiaroscuro of a subject. The principle stipulates that there is a better effect when a light intensity ratio of the first ambient light to the supplemented light is about 4:1, and light supplementation information is generated based on the principle. For detailed description of the negative light supplementation, refer to the following description of FIG. 10b.

In the rimming light, the supplemented light is often placed behind a subject. For example, in a case that the subject is a portrait, the supplemented light is projected onto a head and shoulders of the portrait. In addition, the front of the portrait is not to be too dark. A purpose of this is to highlight the portrait, namely, the subject, and create an overall sense of layering. The principle stipulates that there is a better effect when a light intensity ratio of the first ambient light to the supplemented light is about 4:1. For detailed description of the rimming light, refer to the following description of FIG. 10c.

In the Rembrandt light, the supplemented light is often placed at about 45° of the left front and the right front of a subject, which has a farther distance and is slightly higher than a line of sight of a portrait. A purpose of this is to create more chiaroscuro and depth for a face, with soft transitions between light and dark. The principle stipulates that there is a better effect when a light intensity ratio of the first ambient light to the supplemented light is about 4:1. For detailed description of the Rembrandt light, refer to the following description of FIG. 10d.

In the light splitting, the supplemented light is often placed at a right left side and a right side of a subject, which has an appropriate distance and is parallel to a line of sight of a portrait. A purpose of this is to create strong and dramatic chiaroscuro for a face, with sharp transitions between light and dark, and a dark side completely in shadow. The principle stipulates that there is a better effect when a light intensity ratio of the first ambient light to the supplemented light is about 4:1. For detailed description of the light splitting, refer to the following description of FIG. 10e.

For detailed description of the light supplementation principles, refer to the following description of FIG. 10a to FIG. 10e.

FIG. 10a to FIG. 10e are schematic diagrams of determining a direction of supplemented light based on different light supplementation principles.

Light supplementation principles in embodiments of this application and a process of determining light intensity and a direction of supplemented light in different light supplementation principles are described in detail below with reference to FIG. 10a to FIG. 10e.

The electronic device first determines a first direction by using the roll angle of the first portrait. A process of determining the first direction is as follows: First, an initial direction is generated, where the initial direction is that a point on a positive semi-axis of the Y axis points to the spherical center. Then, the initial direction rotates around the Z axis at a same angle as the roll angle, so that the initial direction is parallel to one of a start side or an end side of the roll angle, to obtain the first direction.

Then, the electronic device determines a plane formed by the direction of the first portrait and the first direction as a first plane.

Then, the electronic device converts the direction of the first portrait into the foregoing spherical coordinate system, and determines the direction of the supplemented light based on the direction of the first ambient light. The electronic device may determine a direction meeting a preset condition as the direction of the supplemented light.

In a light supplementation principle based on positive light supplementation, the direction of the supplemented light may meet the following preset conditions: A projection of the direction of the first ambient light on the first plane is a first projection, and an angle between the direction of the first ambient light and the first projection is a first angle; a projection of the direction of the supplemented light on the first plane is a second projection and the second projection coincides with the first projection, and an angle between the direction of the supplemented light and the second projection is a second angle; and the direction of the supplemented light is on one side of the first plane, but the direction of the first ambient light is on the other side of the first plane. The second angle is 0.8 to 2 times the first angle, for example, 1 time, in other words, the first angle and the second angle are equal.

In this case, the electronic device may determine the light intensity of the supplemented light as 0.25 to 0.8 times the first ambient light, for example, 0.5 times, in other words, the light intensity of the supplemented light:the light intensity of the first ambient light is 1:2.

Figure 10A:
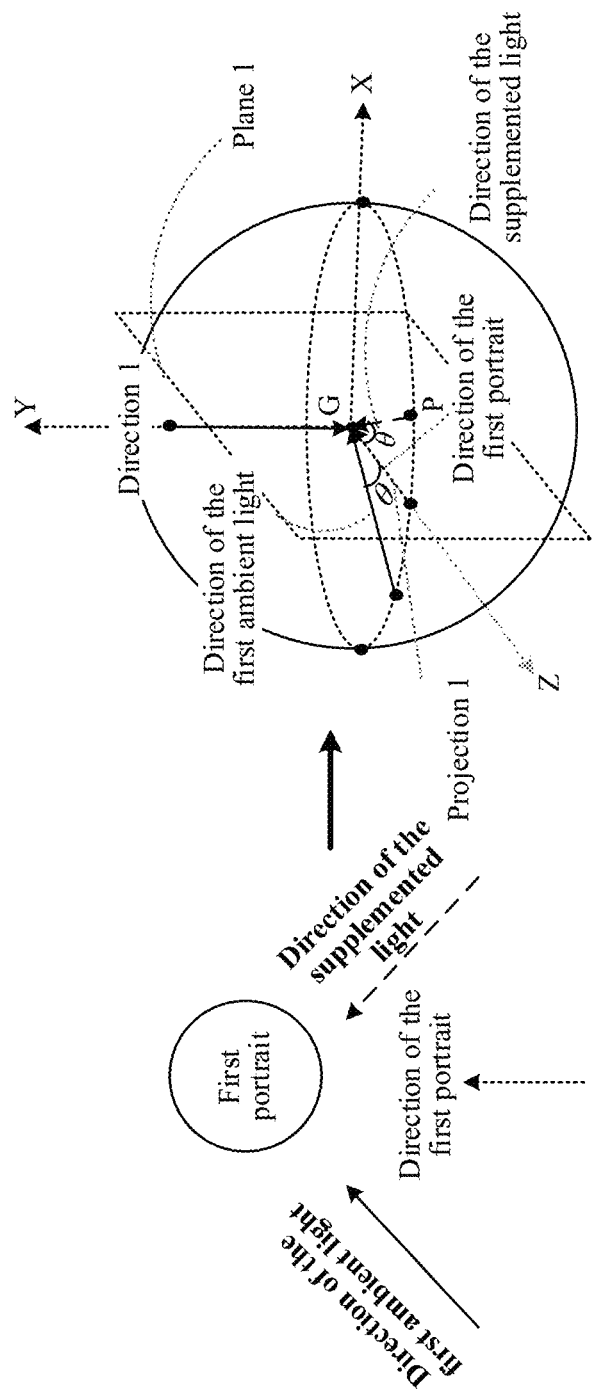
FIG. 10a to FIG. 10e are schematic diagrams of determining a direction of supplemented light based on different light supplementation principles.

In the light supplementation principle, the direction of the supplemented light determined by the electronic device may be shown in FIG. 10a. Assuming that in this case, the second angle is equal to the first angle and the roll angle of the first portrait is 0°, the electronic device may determine that the first direction is a direction 1 and the first plane is a plane 1. The first projection of the first ambient light on the plane 1 is not shown, but coincides with the direction of the first portrait in this example. In this case, the angle between the direction of the first ambient light and the first projection is θ. In this case, the electronic device may determine that a projection on the other side of the first plane coincides with the first projection, and a direction forming the second angle with the first projection is the direction of the supplemented light, namely, a direction in which a point P points to a spherical center G shown in FIG. 10a.

In a light supplementation principle based on negative light supplementation, the direction of the supplemented light may meet the following preset condition: In a plane formed by the direction of the first portrait and the direction of the first ambient light, an angle between the direction of the supplemented light and the direction of the first ambient light may be 0° to 10°, for example, 0°, in other words, the direction of the supplemented light and the direction of the first ambient light are the same.

In this case, the electronic device may determine the light intensity of the supplemented light as 0.25 to 0.8 times the first ambient light, for example, 0.25 times, in other words, the light intensity of the supplemented light:the light intensity of the first ambient light is 1:4.

Figure 10B:
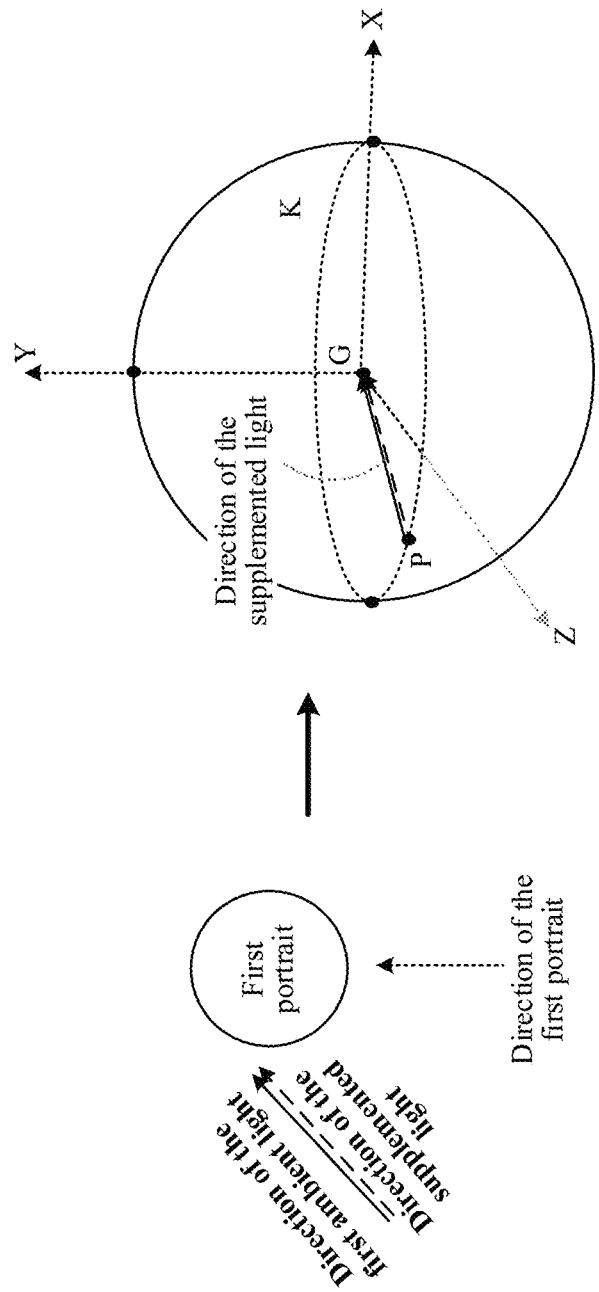

In the light supplementation principle, the direction of the supplemented light determined by the electronic device may be shown in FIG. 10b. In the plane formed by the direction of the first portrait and the direction of the first ambient light, the electronic device may determine the direction of the first ambient light as the direction of the supplemented light, namely, a direction in which a point P points to a spherical center G shown in FIG. 10b.

In a light supplementation principle based on rimming light, the direction of the supplemented light may meet the following preset condition: The direction of the supplemented light and the direction of the first portrait are the same. Corresponding to the first ambient light image, it may be explained as that, the electronic device may determine a point from a spherical surface behind the first portrait, and a direction from the point to a spherical center and the direction of the first portrait are the same.

In this case, the electronic device may determine the light intensity of the supplemented light as 0.25 to 0.8 times the first ambient light, for example, 0.25 times, in other words, the light intensity of the supplemented light:the light intensity of the first ambient light is 1:4.

Figure 10C:
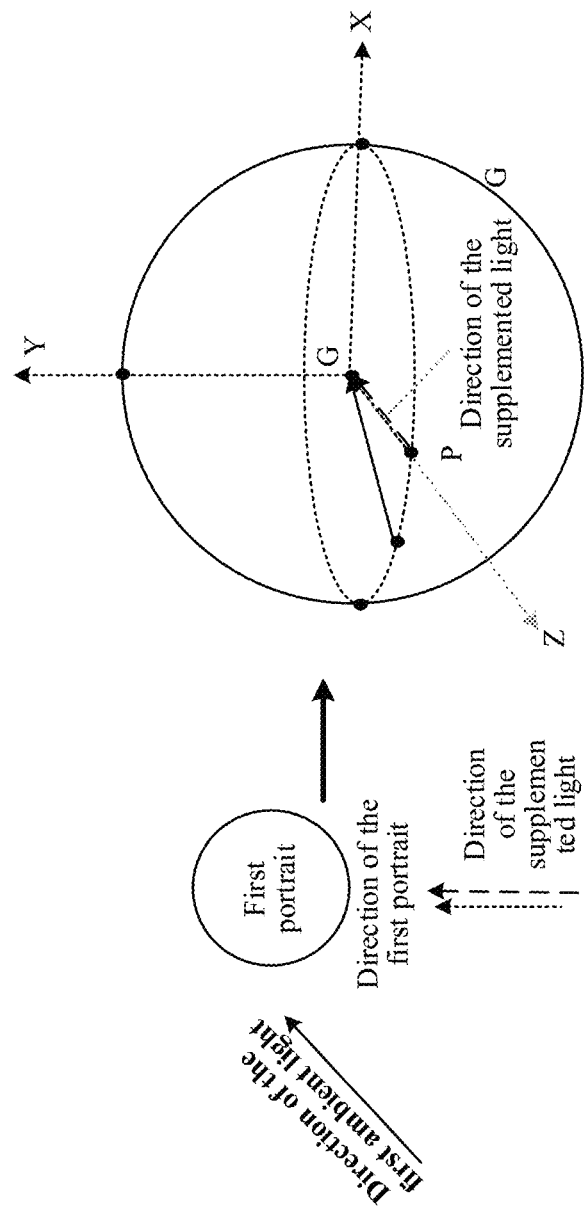

In the light supplementation principle, the direction of the supplemented light determined by the electronic device may be shown in FIG. 10c. The electronic device may determine the direction of the first portrait as the direction of the supplemented light, namely, a direction in which a point P points to a spherical center G shown in FIG. 10c.

In a light supplementation principle based on Rembrandt light, it may be set that the supplemented light includes first supplemented light and second supplemented light, and a direction of the first supplemented light and a direction of the second supplemented light may meet the following preset conditions: The first supplemented light is on one side of the first plane, but the second supplemented light is on the other side of the first plane; a projection of the first supplemented light on the first plane is a third projection, a projection of the second supplemented light on the first plane is a fourth projection, and the third projection coincides with the fourth projection; an angle between the third projection and the direction of the first portrait and an angle between the fourth projection and the direction of the first portrait are 10° to 20°, for example, 15°; and an angle between the first supplemented light and a first projection and an angle between the second supplemented light and the fourth projection are 40° to 50°, for example, 45°.

In this case, the electronic device may determine the light intensity of the supplemented light as 0.25 to 0.8 times the first ambient light, for example, 0.25 times, in other words, the light intensity of the supplemented light:the light intensity of the first ambient light is 1:4.

Figure 10D:
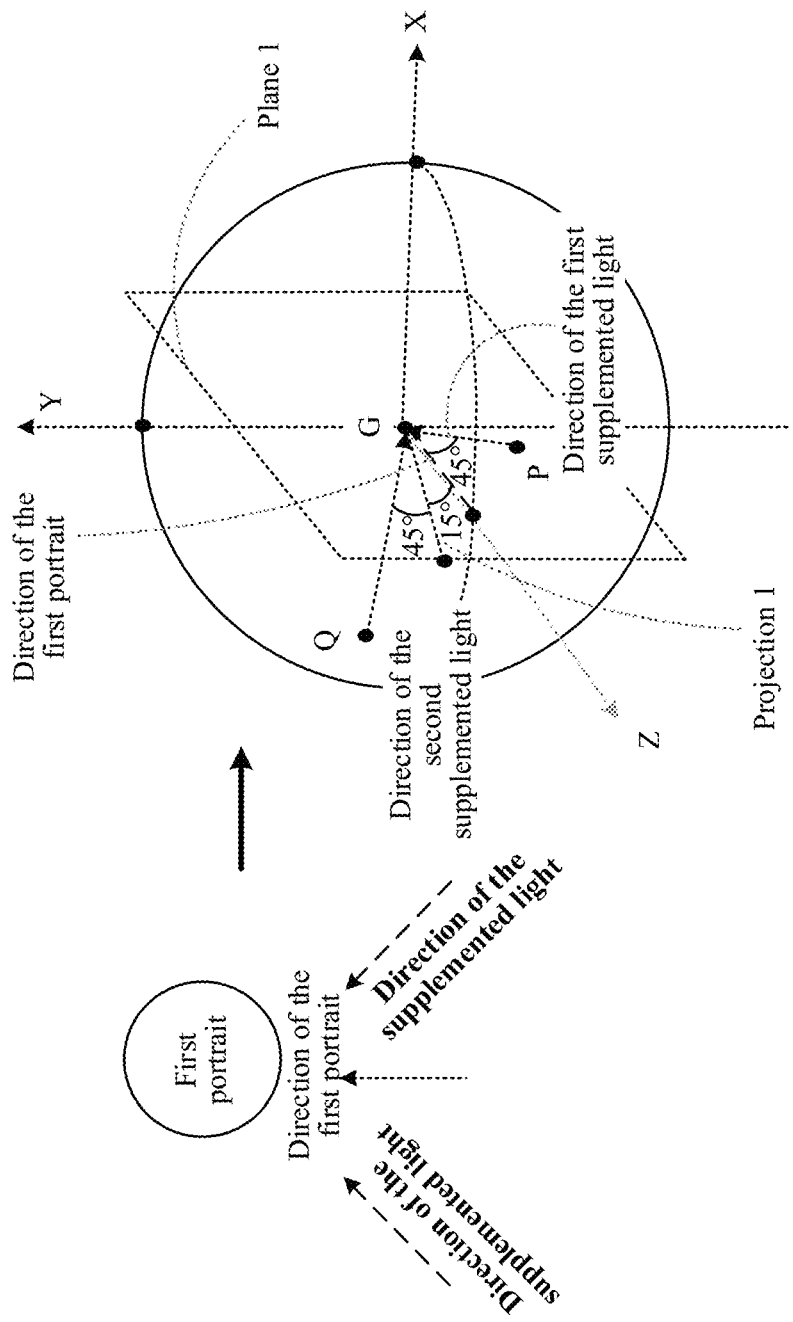

In the light supplementation principle, the direction of the supplemented light determined by the electronic device may be shown in FIG. 10d. The first plane is a plane 1. The electronic device may determine that in the first plane, a projection 1 in a direction of 15° from the direction of the first portrait is the projection of the first supplemented light, and a direction of 45° from the projection 1 is the direction of the first supplemented light, namely, a direction in which a point P points to a spherical center G shown in FIG. 10d. A direction of a point Q is the direction of the second supplemented light. For description of the point Q, refer to the description of the point P. Details are not described herein again.

In a light supplementation principle based on light splitting, it may be set that the supplemented light includes first supplemented light and second supplemented light, and a direction of the first supplemented light may meet the following preset conditions: The first supplemented light is on one side of the first plane, but the second supplemented light is on the other side of the first plane; a projection of the first supplemented light on the first plane is a third projection, a projection of the second supplemented light on the first plane is a fourth projection, the third projection coincides with the fourth projection, and the projections coincide with a spherical center G; and an angle between the direction of the first supplemented light and the direction of the first portrait and an angle between a direction of the second supplemented light and the direction of the first portrait are 90°.

In this case, the electronic device may determine the light intensity of the supplemented light as 0.25 to 0.8 times the first ambient light, for example, 0.25 times, in other words, the light intensity of the supplemented light:the light intensity of the first ambient light is 1:4.

Figure 10E:
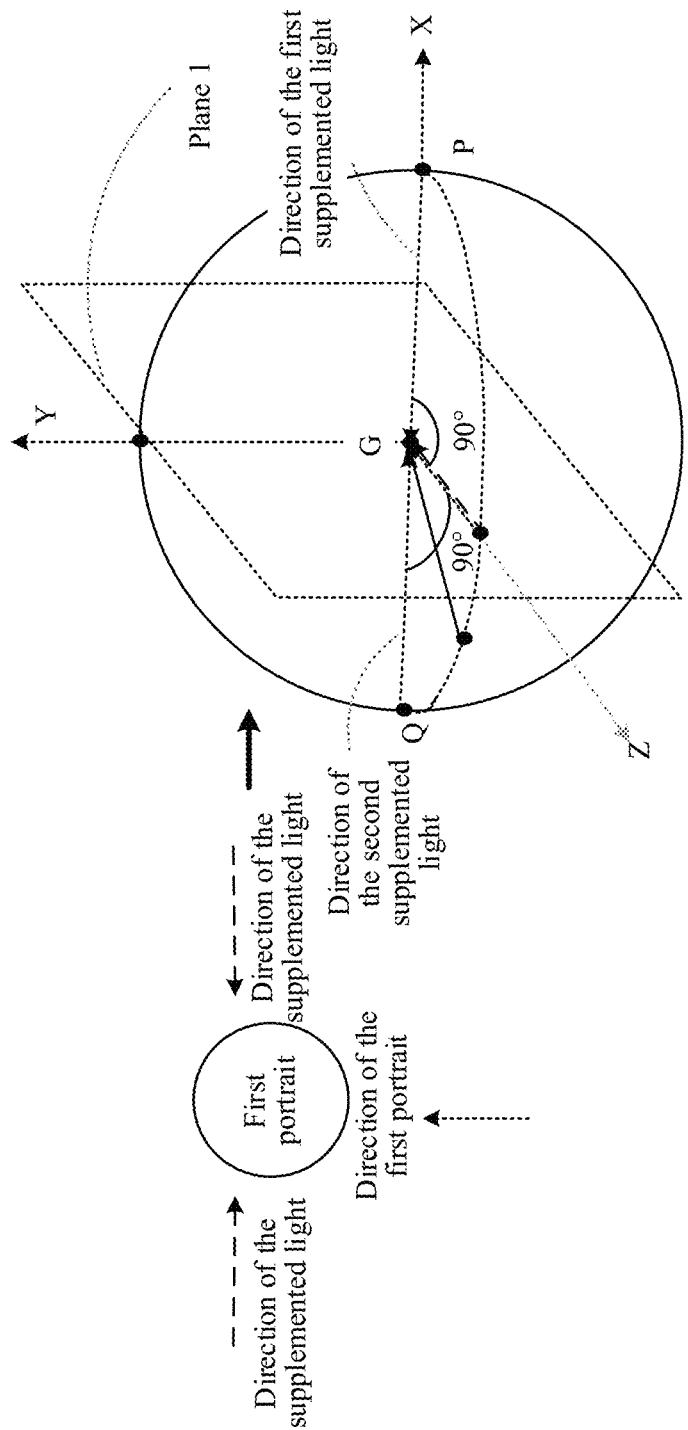

In the light supplementation principle, the direction of the supplemented light determined by the electronic device may be shown in FIG. 10e. The first plane is a plane 1. The electronic device may determine that in the first plane, a direction that is projected onto the spherical center G and is of 90° from the first portrait is the direction of the first supplemented light, namely, a direction in which a point P points to the spherical center G shown in FIG. 10e. A direction of a point Q is the direction of the second supplemented light. For description of the point Q, refer to the description of the point P. Details are not described herein again.

It may be understood that, in addition to the foregoing light supplementation principles based on the positive light supplementation, the negative light supplementation, the rimming light, the Rembrandt light, and the light splitting, there may also be other light supplementation principles. This is not limited in this embodiment of this application.

S203: The electronic device adjusts the first ambient light image corresponding to the first spherical harmonic illumination based on the light intensity and the direction of the supplemented light, to obtain a second ambient light image.

In some embodiments, the electronic device first determines a light-supplemented image corresponding to the supplemented light based on the light intensity and the direction of the supplemented light, and the first ambient light image; and then adjusts the first ambient light image based on the light-supplemented image, to obtain the second ambient light image.

The second ambient may indicate, in the second ambient light, light intensity and a direction of illumination corresponding to any point on a spherical surface around the first portrait.

For a process in which the electronic device obtains the light-supplemented image, refer to the following description.

The electronic device determines a light supplementation point based on the direction of the supplemented light in step S202, where a direction of the light supplementation point and the direction of the supplemented light are the same. For example, the points P shown in FIG. 10a to FIG. 10e and the points Q shown in FIG. 10d and FIG. 10e are denoted as light supplementation points. A direction in which each of the light supplementation points points to the spherical center is the direction of the second supplemented light.

The electronic device may indicate the light supplementation point by using a 2-tuple, where values of the 2-tuple are a pitch angle and a yaw angle corresponding to the light supplementation point respectively.

The electronic device determines a first region in the first ambient light image based on an ambient light point. Specifically, the electronic device may use, in the first ambient light image, a region corresponding to all points on a spherical surface whose center is the ambient light point and whose radius is equal to a first threshold as the first region. For example, as shown in (a) of FIG. 9, the ambient light point is the point U, and the radius is r. In this case, the first region is a region 1.

The electronic device multiplies light intensity of the points in the first region by an adjustment parameter, and yaw angles and pitch angles remain unchanged, to obtain a second region. The adjustment parameter is a ratio of the light intensity of the supplemented light to the light intensity of the first ambient light.

Then, the electronic device replaces a third region in a non-illumination image with the second region, to obtain the light-supplemented image. The non-illumination image refers to light intensity and a direction of illumination corresponding to any point on a spherical surface around the first portrait when there is no ambient light. The electronic device may replace values of all elements in the first ambient light image with 255, to obtain the non-illumination image. The third region is, in the non-illumination image, a region corresponding to all points on a spherical surface whose center is a light supplementation point and whose radius is equal to the first threshold. For example, (b) of FIG. 9 is a schematic diagram of the light-supplemented image. The light supplementation point is a point P, the radius is r, the second region is a region 2, and a region replaced with the second region is the third region.

The electronic device may adjust the first ambient light image based on the light-supplemented image, to obtain the second ambient light image. Specifically, the electronic device adds light intensity of any point in the first ambient light image to light intensity of a corresponding point in the light-supplemented image, to obtain the second ambient light image. The correspondence means that yaw angles and pitch angles of the two points are the same.

In some other embodiments, in a process in which the electronic device generates the second ambient light, the light-supplemented image described above may not be involved, but light intensity of any point in a fourth region in the first ambient light image is added to light intensity of a corresponding point in the second region, to obtain the second ambient light image. The correspondence means that yaw angles and pitch angles of the two points are the same. The fourth region is, in the first ambient light image, a region corresponding to all points on a spherical surface whose center is a light supplementation point and whose radius is equal to the first threshold.

It should be understood that, the content related to (b) of FIG. 9 and (c) of FIG. 9 is obtained based on the light supplementation principle of the positive light supplementation. For other light supplementation principles, if directions of supplemented light determined by the electronic device are different, determined light supplementation points are different, and obtained second ambient light images are different. The process is similar to step S203, and refer to the description of step S203. Details are not described herein again. In particular, for the light supplementation principle for generating the first supplemented light and the second supplemented light, the electronic device may determine two light supplementation points, and a process of generating the second ambient light image is a combination of executing processes in step S203 for the two light supplementation points.

The electronic device may indicate the second ambient light image by using a matrix. The matrix has X elements, where any element may indicate a point in space around the first portrait in the second ambient light. Any element is a triplet, any value in the triplet indicates a pitch angle, a yaw angle, or brightness of the point in the second ambient light image, and a value range corresponding to the brightness is (0 to 255).

S204: The electronic device obtains the second spherical harmonic illumination based on the second ambient light image.

The electronic device maps the second spherical harmonic illumination to the second ambient light image, where a used algorithm may be an inverse function of the spherical harmonics.

The second spherical harmonic illumination is M second spherical harmonic illumination coefficients corresponding to the red channel/the green channel/the blue channel respectively. The electronic device may indicate the light intensity and the direction of the second ambient light by using M×3 second spherical harmonic illumination coefficients. M second spherical harmonic illumination coefficients corresponding to any channel may indicate a component of the second ambient light on the channel, where the component includes components of the light intensity and the direction of the second ambient light. M may be valued as 9, or may be another value. This is not limited in this embodiment of this application.

S107: The electronic device generates an illumination image corresponding to the first image based on the normal vector image and the second spherical harmonic illumination.

The illumination image corresponding to the first image is for describing, in the second ambient light, light intensity of any pixel in the first image on the red channel, the green channel, and the blue channel. (d) of FIG. 5 is a schematic diagram of the illumination image. Light intensity indicates a brightness value of any pixel on the red channel/the green channel/the blue channel. A value range of the brightness value may be 0 to $2^N$, where N is a positive integer greater than or equal to 1, and may be usually 8 or 10. When N is 8, it indicates that a bit depth of any pixel is 8 bits, and the value range of the brightness value is 0 to 255. When N is 10, it indicates that the bit depth of the pixel is 10 bits, and the value range of the brightness value is 0 to 1023. Three brightness values of any pixel describe a color of the any pixel, for example, a brightness value of a pixel on the red channel/the green channel/the blue channel is (255, 255, 255), to indicate that the corresponding pixel is white.

The electronic device may perform a dot product on the normal vector image and the second spherical harmonic illumination, to obtain the illumination image.

Specifically, when the electronic device may perform a dot product on the matrix indicating the normal vector image and a matrix indicating the second spherical harmonic illumination, a matrix that may indicate the illumination image is obtained. A quantity of elements of the matrix indicating the illumination image and a quantity of elements of the matrix indicating the normal vector image are the same, any element in the matrix indicating the illumination image is a triplet, and any value in the triplet indicates light intensity corresponding to any pixel in the first image on one color channel in the red channel, the green channel, and the blue channel.

S108: The electronic device calculates an albedo image of the first image.

The albedo image may reflect texture and color information of the first portrait, and is for describing acceptance degrees of any pixel in the first image to light intensity on the red channel, the green channel, and the blue channel. (d) of FIG. 5 is a schematic diagram of the albedo image. For example, in the illumination image, a brightness value of a pixel on the red channel/the green channel/the blue channel is (255, 255, 255), to indicate that the pixel is white. However, in the albedo image, an acceptance degree of the pixel to the light intensity on the red channel/the green channel/the blue channel is (0, 0, 0). In this case, in a light-supplemented first image, a brightness value of the pixel point on the red channel/the green channel/the blue channel is (255×0, 255×0, 255×0)=(0, 0, 0), and a color of the pixel is black.

The albedo image is an image obtained based on an albedo feature of the to-be-processed image, and may be specifically an image obtained based on the albedo feature of the first image.

In a possible implementation, the electronic device first extracts an image feature in the first image, to obtain a feature map. Then, the electronic device extracts, by using a second residual module, the albedo feature of the first image by using the feature map. Second convolution is performed on the albedo feature to obtain the albedo image.

The electronic device may indicate the albedo image by using a matrix. Each element in the matrix corresponds to a pixel in the image. Each element in the matrix is a triplet, any value in the triplet may indicate an acceptance degree of any pixel in the first image to light intensity on one color channel in the red (red) channel, the green (green) channel, and the blue (blue) channel.

In a possible implementation, the electronic device may calculate, based on the first image, the albedo image of the first image through a second U-Net network, where the second U-Net network may include the second residual module configured to extract the albedo feature.

It should be understood that, in addition to the second U-Net network, another algorithm may also be used to obtain the albedo image. This is not limited in this embodiment of this application.

S109: The electronic device performs light supplementation on the first image based on the albedo image and the illumination image, to obtain a light-supplemented first image.

The electronic device may multiply the albedo image by the illumination image, to obtain the light-supplemented first image. (f) of FIG. 5 shows the light-supplemented first image.

Specifically, when the electronic device may perform a dot product on the matrix indicating the albedo image and the matrix indicating the illumination image, a matrix that may indicate the light-supplemented first image is obtained. A quantity of elements of the matrix indicating the light-supplemented first image and a quantity of elements of the matrix indicating the first image are the same, any element in the matrix indicating the light-supplemented first image is a triplet, and any value in the triplet indicates, in second ambient light, a brightness value of any pixel in the first image on one color channel in the red channel, the green channel, and the blue channel.

S110: The electronic device replaces the first image in the to-be-processed image with the light-supplemented first image.

The electronic device replaces all pixels in the first image in the to-be-processed image with all pixels in the light-supplemented first image, to obtain a light-supplemented to-be-processed image.

It should be understood that, step S101 to step 109 is explained by using the portrait of the first user as the first target object as an example. In other cases, the first target object may also be other content, such as the portrait of the first user and the body of the first user in step S301 to step S306.

In this embodiment of this application, a pose parameter of the first target object includes information such as pose information of the first target object and/or a direction of the first target object.

A process in which the electronic device performs light supplementation on a portrait and a body of a user in the to-be-processed image in Scene 2 is described below.

The to-be-processed image includes N users, where N is an integer greater than or equal to 1. The electronic device may perform light supplementation on a portrait of any of the users by using the image light supplementation method in this embodiment of this application.

An example in which the electronic device performs light supplementation on the portrait and the body of the first user is used for detailed description. For another user, refer to the description of performing light supplementation on the portrait and the body of the first user.

In some embodiments, the electronic device may perform light supplementation on the portrait of the first user and the body of the first user in the to-be-processed image respectively, to obtain a light-supplemented to-be-processed image.

Figure 11:
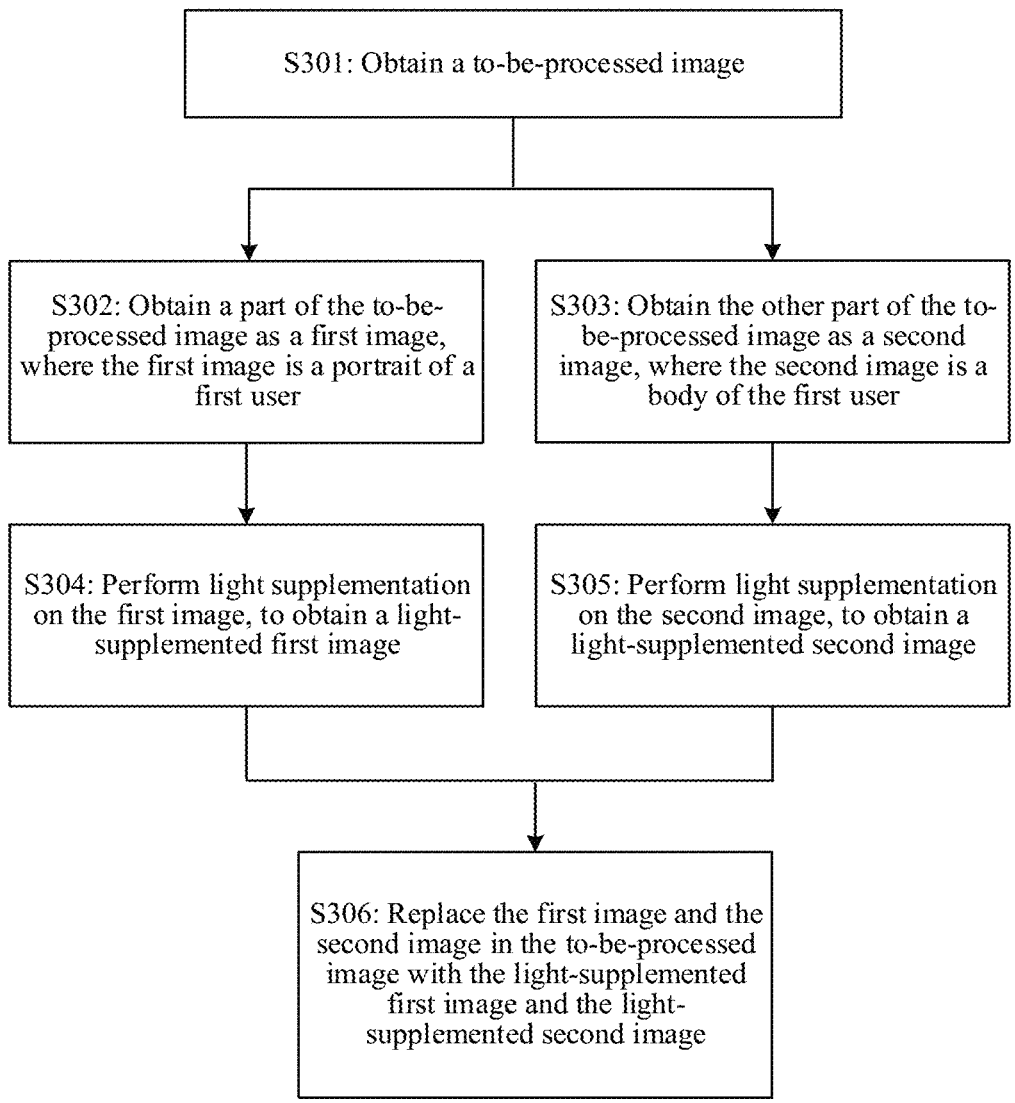
FIG. 11 is a schematic flowchart in which an electronic device performs light supplementation on a portrait and a body of a first user.

FIG. 11 is a schematic flowchart in which an electronic device performs light supplementation on a portrait and a body of a first user.

For a process in which the electronic device performs light supplementation on the portrait and the body of the first user, refer to description of step S301 to step S306.

S301: An electronic device obtains a to-be-processed image.

The process is the same as the description of step S101. For the process, refer to the description of step S101.

S302: The electronic device obtains a part of the to-be-processed image as a first image, where the first image is the portrait of the first user.

The process is the same as the description of step S102. For the process, the electronic device may refer to the description of step S102.

S303: The electronic device obtains the other part of the to-be-processed image as a second image, where the second image is the body of the first user.

The second image includes the body of the first user, namely, a part other than the portrait of the first user in the first user.

The electronic device may recognize the body of the first user from the to-be-processed image, and then crops the body of the first user, to obtain the second image.

S304: The electronic device performs light supplementation on the first image, to obtain a light-supplemented first image.

A process involved in step S304 is the same as step S103 to step S110. For the process, refer to the description of step S103 to step S110.

S305: The electronic device performs light supplementation on the second image, to obtain a light-supplemented second image.

A process involved in step S305 is similar to step S103 to step S109. However, a processed object in step S103 to step S109 is not the body of the first user, but the portrait of the first user. For the process, refer to the description of step S103 to step S109.

S306: The electronic device replaces the first image and the second image in the to-be-processed image with the light-supplemented first image and the light-supplemented second image.

The electronic device replaces all pixels in the first image and the second image in the to-be-processed image with all pixels in the light-supplemented first image and the light-supplemented second image, to obtain a light-supplemented to-be-processed image.

Parameters in the first U-Net network, the VGG network, and the second U-Net network in step S101 to step S110 are described below.

It should be understood that, the parameters of the first U-Net network, the VGG network, and the second U-Net network are determined in a training process. Then, the first U-Net network, the VGG network, and the second U-Net network that are trained are preset in the electronic device.

In a possible implementation, for the process in which the electronic device trains the parameters in the first U-Net network, the VGG network, and the second U-Net network, refer to the following description.

Figure 12:
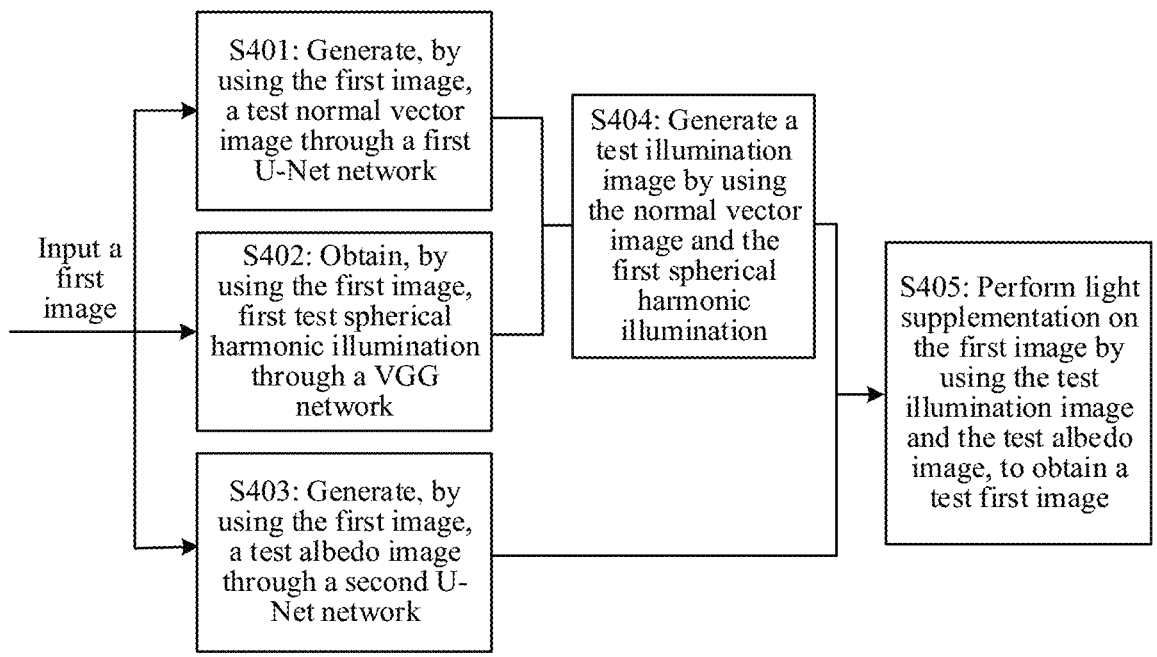
FIG. 12 is a schematic diagram in which an electronic device trains parameters in a first U-Net network, a VGG network, and a second U-Net network.

FIG. 12 is a schematic diagram in which an electronic device trains parameters in a first U-Net network, a VGG network, and a second U-Net network.

The electronic device uses a first image as input, generates a test first image through the first U-Net network, the VGG network, and the second U-Net network, then calculates an error between the test first image and the first image, and constantly revises the parameters in the first U-Net network, the VGG network, and the second U-Net network, and stops training when the error between the test first image and the first image is less than a threshold. The training process is as follows.

S401: The electronic device generates, by using the first image, a test normal vector image through the first U-Net network.

The first U-Net network may include a first residual module configured to extract a normal vector feature. The electronic device first extracts an image feature in the first image, to obtain a feature map. Then, the electronic device extracts, by using the first residual module, the normal vector feature of the first image by using the feature map. First convolution is performed on the normal vector feature to obtain the normal vector image. The image feature is for describing information such as a color feature and a texture feature of the first image.

S402: The electronic device obtains, by using the first image, first test spherical harmonic illumination through the VGG network.

Specifically, the electronic device first extracts an image feature in the first image, to obtain a feature map of the first image. Then, the normal vector feature and an albedo feature of the first image are extracted by using the feature map. Then, the electronic device obtains the first spherical harmonic illumination by using the image feature, the normal vector feature, and the albedo feature.

S403: The electronic device generates, by using the first image, a test albedo image through the second U-Net network.

The second U-Net network may include a second residual module configured to extract an albedo feature.

Specifically, the electronic device first extracts an image feature in the first image, to obtain a feature map. Then, the electronic device extracts, by using the second residual module, the albedo feature of the first image by using the feature map. Second convolution is performed on the albedo feature to obtain the albedo image.

S404: The electronic device generates a test illumination image by using the normal vector image and the first spherical harmonic illumination.

During a test process, light supplementation is not required. Therefore, the electronic device may perform a dot product on the first spherical harmonic illumination corresponding to first ambient light and the normal vector image, to generate the test illumination image.

S405: The electronic device performs light supplementation on the first image by using the test illumination image and the test albedo image, to obtain the test first image.

The electronic device may multiply the test illumination image by the test albedo image, to obtain the test first image.

It should be understood that, S401 to S405 are a training manner for the first U-Net network, the VCG network, and the second U-Net network. There may also be another training manner. This should not be limited in this embodiment of this application.

It should be understood that, parameters in the networks for the body of the first user in Scene 2 are similar to those in the process. For the process, refer to the description of step S401 to step S402. Details are not described herein again.

In embodiments of this application, in a to-be-processed image, an image including a first target object may be referred to as a first region image or an image corresponding to a first target object may be referred to as a first region image (for example, if an image includes a person A and a target object is a face, a part of the image including the face of A is a first region image).

Two use scenes of the image light supplementation method in embodiments of this application are described below.

In the use scenes, an example in which the electronic device performs light supplementation on the portrait of the first user rather than the body of the first user is used.

Use scene 1: When the electronic device starts a camera application, the electronic device may acquire a to-be-processed image, and perform image light supplementation on the to-be-processed image by using the image light supplementation method in the solution in real time, so that an image displayed on a display screen is a light-supplemented to-be-processed image.

For a possible example user interface in Use scene 1, refer to the description of FIG. 2. Details are not described herein again.

Use scene 2: The electronic device may perform post processing on a to-be-processed image by using the image light supplementation method in the solution.

In some embodiments, a process in which the electronic device performs post processing on the to-be-processed image by using the image light supplementation method in the solution may be triggered by an operation of a user.

FIG. 13a to FIG. 13d show a set of example user interfaces for an electronic device to perform post light supplementation on a to-be-processed image.

Figure 13A:
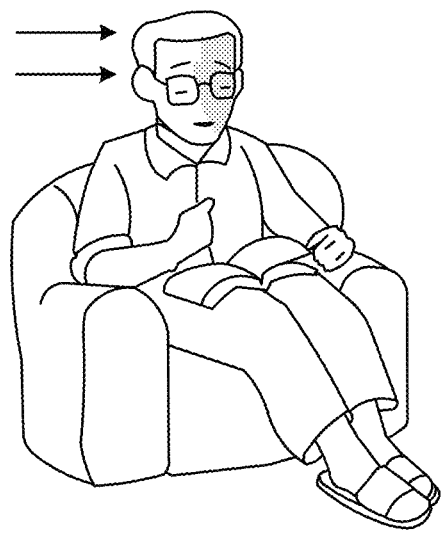
FIG. 13a to FIG. 13d show a set of example user interfaces for an electronic device to perform post light supplementation on a to-be-processed image.
Figure 13A:
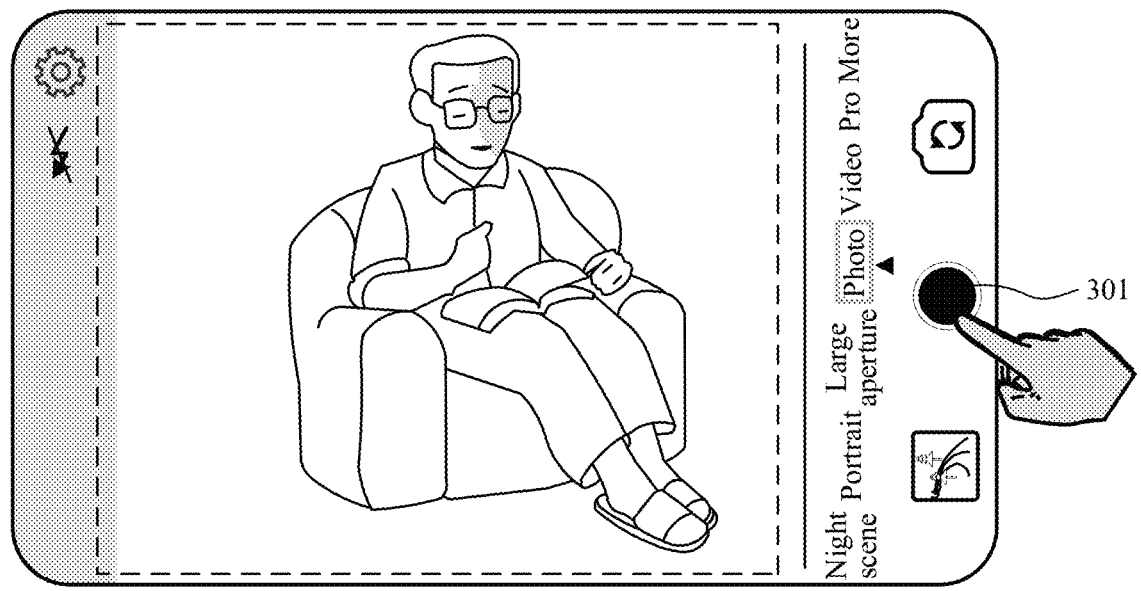
Figure 13B:
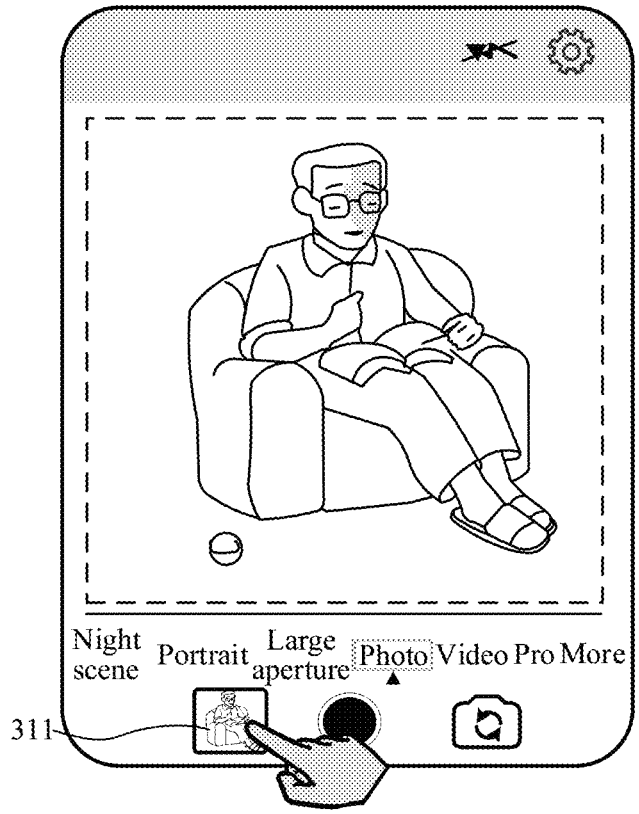
Figure 13B:
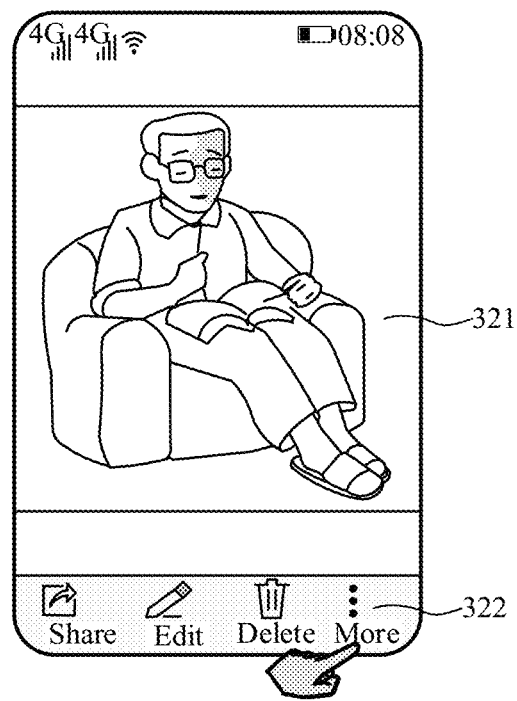
Figure 13C:
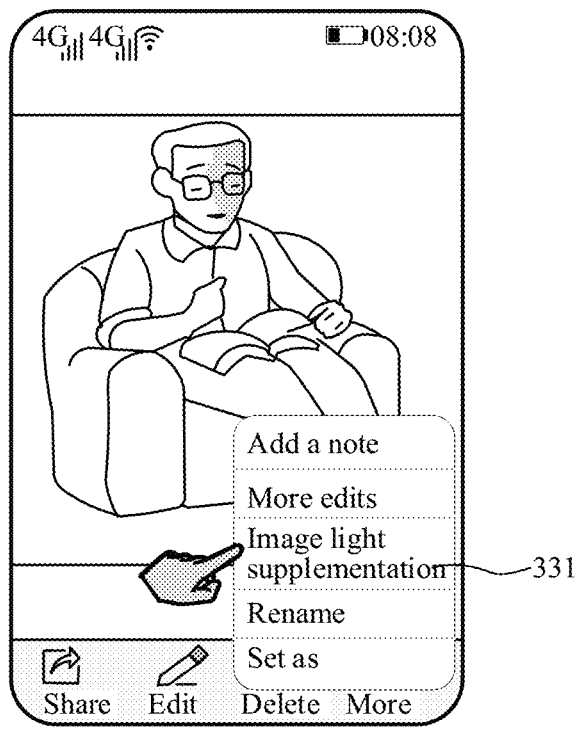
Figure 13C:
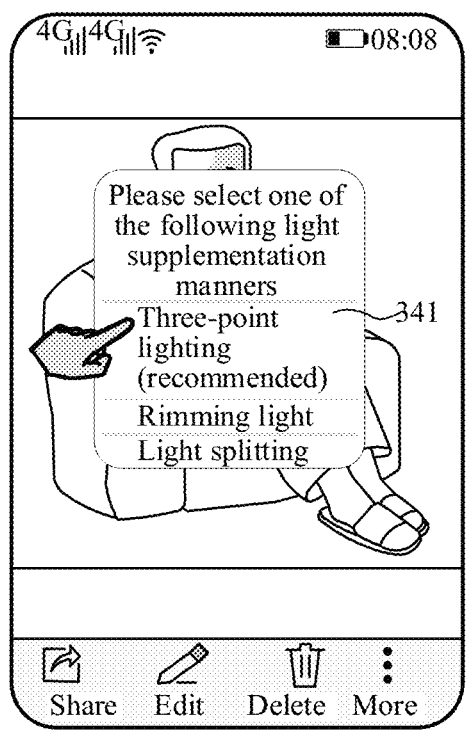
Figure 13D:
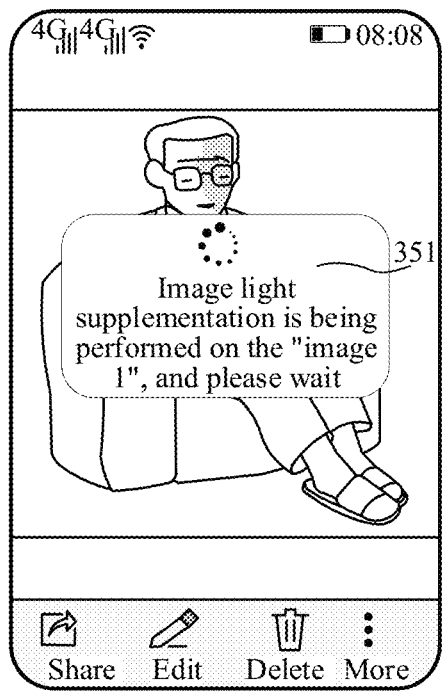
Figure 13D:
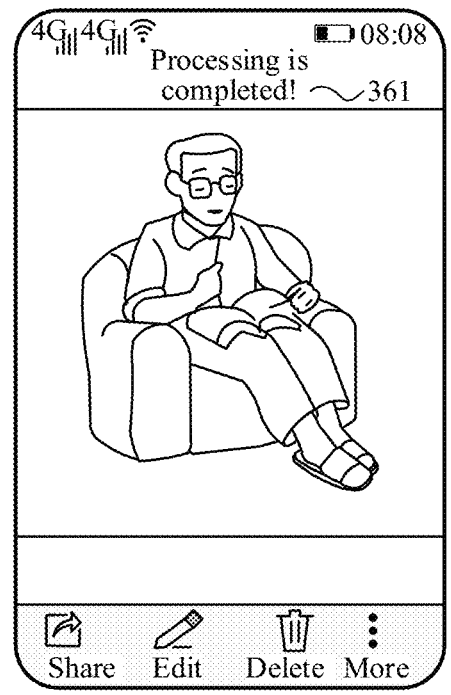

FIG. 13a shows an example scene in which the electronic device captures the to-be-processed image. First ambient light is irradiated from one side of a face of a first user to the face of the first user. However, the other side of the face lacks illumination due to occlusion, causing the face of the side to be darker. In this case, in response to an operation (such as a click operation) of the user on a capturing control 301, the electronic device may capture the to-be-processed image; and displays a user interface 31 shown in FIG. 13b.

The user interface 31 includes an echo control 311, and the to-be-processed image may be displayed in the echo control 311. One side of the face of the first user in the to-be-processed image lacks illumination due to occlusion, causing the face of the side to be darker. In response to an operation (such as a click operation) of the user on the echo control 311, the electronic device may display a user interface 32 shown in FIG. 13b.

The user interface 32 includes a preview box 321, and the electronic device may display the to-be-processed image in the preview box 321. The user interface 32 further includes a more settings control 322. In response to an operation (such as a click operation) of the user on the more settings control 322, the electronic device may display a user interface 33 shown in FIG. 13c.

Several setting items of the to-be-processed image may be displayed on the user interface 33, including an image light supplementation setting item 331. The image light supplementation setting item 331 may be for triggering the electronic device to perform light supplementation on the to-be-processed image. In response to an operation (such as a click operation) of the user on the image light supplementation setting item 331, the electronic device may display a user interface 34 in FIG. 13c.

An image light supplementation prompt box 341 may be displayed on the user interface 34. The image light supplementation prompt box 341 may be for prompting the user to select a light supplementation mode. In response to an operation (such as a click operation) of the user on a "positive light supplementation" control, the electronic device may perform image light supplementation on the to-be-processed image, where a used light supplementation principle is a light supplementation principle based on the positive light supplementation. In this case, the electronic device may display a user interface 35 shown in FIG. 13d.

The user interface 35 is a user interface on which the electronic device performs light supplementation on the to-be-processed image by using the light supplementation principle based on the positive light supplementation. A prompt box 351 may be displayed on the user interface 35, and a prompt text: "Image light supplementation is being performed on an 'image 1', and please wait" may be displayed in the prompt box 351. After the processing is completed, the electronic device may display a user interface 36 shown in FIG. 13d.

The user interface 36 is a user interface after which the electronic device performs light supplementation on the to-be-processed image by using the light supplementation principle based on the positive light supplementation, to obtain a light-supplemented to-be-processed image. A prompt text 361: "Processing is completed" may be displayed on the user interface 36. It may be seen that, in this case, in the image, the other side of the face of the first user in the to-be-processed image is no longer darker.

An example electronic device provided in an embodiment of this application is described below.

Figure 14:
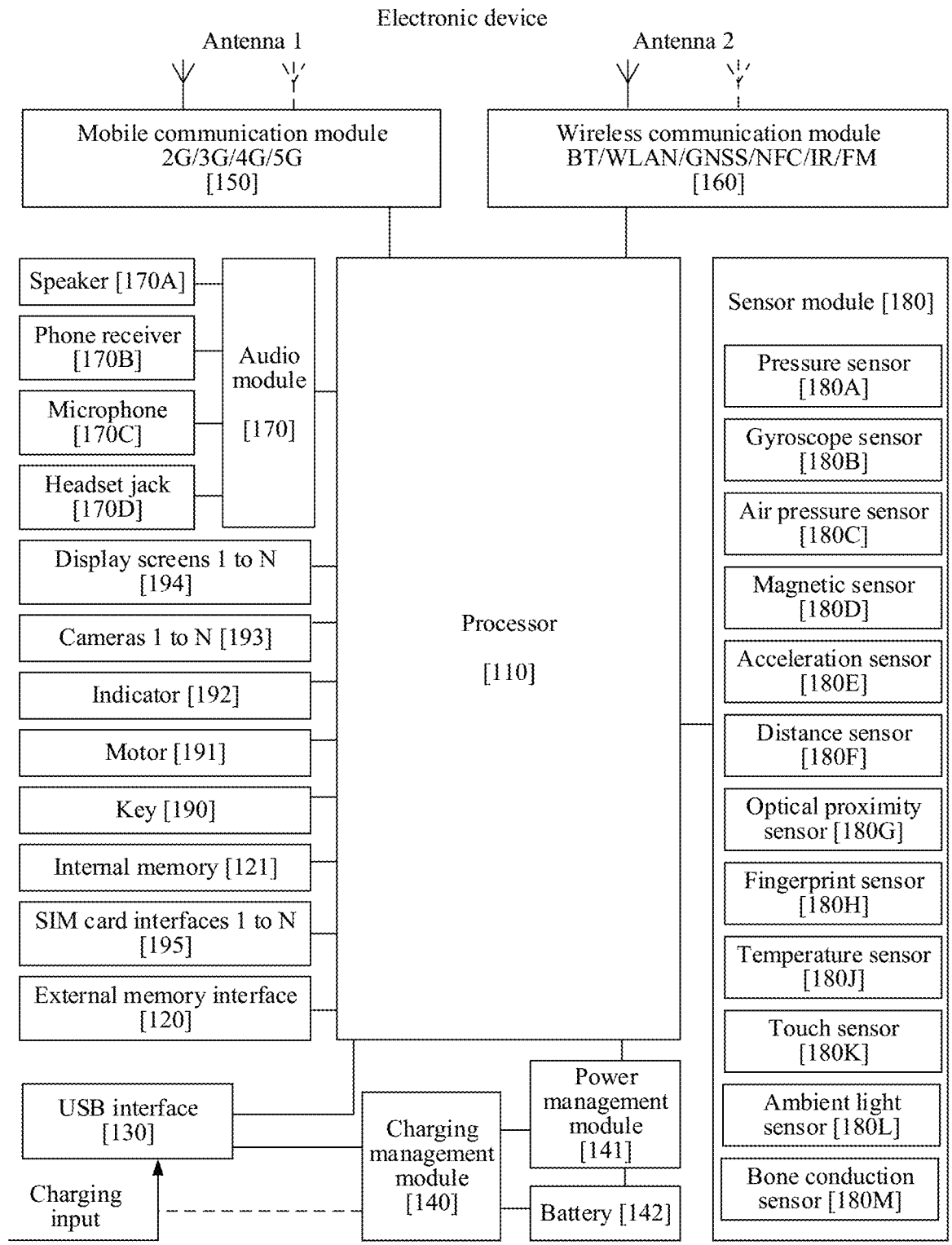
FIG. 14 is a schematic diagram of a structure of an electronic device according to an embodiment of this application.

FIG. 14 is a schematic diagram of a structure of an electronic device according to an embodiment of this application.

The embodiment is described below in detail by using the electronic device as an example. It should be understood that, the electronic device may have more or fewer parts than those shown in the figure, may combine two or more parts, or may have a different part configuration. The components shown in the figure may be implemented by hardware that includes one or more signal processors and/or application-specific integrated circuits, software, or a combination of hardware and software.

The electronic device may include: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, an air pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present invention does not constitute a specific limitation on the electronic device. In some other embodiments of this application, the electronic device may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device. The controller may generate an operation control signal based on an instruction operation code and a time-sequence signal, to implement control of fetching instructions and executing the instructions.

The processor 110 may be further configured with a memory, to store instructions and data. In some embodiments, the memory in the processor 110 is a cache memory. The memory may store an instruction or data that is just used or used cyclically by the processor 110. If the processor 110 needs to use the instruction or the data again, the processor 110 may directly invoke the instruction or the data from the memory, which avoids repeated access, and reduces a waiting time of the processor 110, thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, and the like.

It may be understood that an interface connection relationship between the modules illustrated in this embodiment of the present invention is merely an example for description, and does not constitute a limitation on a structure of the electronic device. In some other embodiments of this application, the electronic device may alternatively use an interface connection manner different from that in the foregoing embodiment, or use a combination of a plurality of interface connection manners.

The electronic device implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute program instructions to generate or change display information.

The display screen 194 is configured to display an image, a video, or the like.

The electronic device may implement a capturing function by using the ISP, the camera 193, the video codec, the GPU, the display screen 194, the application processor, and the like.

The ISP is configured to process data fed back by the camera 193. For example, during capturing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may alternatively perform algorithm optimization on noise, luminance, and complexion of the image. The ISP may alternatively optimize parameters such as exposure and a color temperature of a capturing scene. In some embodiments, the ISP may be disposed in the camera 193.

The camera 193 is configured to capture a still image or a video. An optical image of an object is generated through a lens and is projected to the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, and N is a positive integer greater than 1.

The external memory interface 120 may be configured to connect to an external storage card, for example, a micro SD card, to expand a storage capability of the electronic device. The external storage card communicates with the processor 110 through the external memory interface 120, to implement a data storage function, for example, storing a file such as a music or a video in the external storage card.

The internal memory 121 may be configured to store computer-executable program code. The executable program code includes instructions. The processor 110 runs the instruction stored in the internal memory 121, to perform various function applications and data processing of the electronic device. The internal memory 121 may include a program storage region and a data storage region.

The touch sensor 180K is also referred to as a "touch panel". The touch sensor 180K may be disposed in the display screen 194, and the touch sensor 180K and the display screen 194 constitute a "touch screen".

In some embodiments, when the touch sensor 180K of the electronic device receives an operation (such as a click operation) for a capturing control in a camera application, a corresponding hardware interrupt is sent to a kernel layer. The kernel layer processes the operation into an original input event (including information such as coordinates of a touch and a time stamp of the touch operation). The original input event is stored at the kernel layer. An application framework layer obtains the original input event from the kernel layer, recognizes a control corresponding to the input event as the capturing control in the camera application, and then invokes the camera application to start the camera application through an interface of the application framework layer, to start a camera drive by invoking the kernel layer, and acquire a to-be-processed image through the camera 193. Specifically, the camera 193 of the electronic device may transmit a light signal reflected by a captured object to an image sensor of the camera 193 through a lens, the image sensor converts the light signal into an electrical signal, the image sensor transmits the electrical signal to an ISP, and the ISP converts the electrical signal into the to-be-processed image and may store the to-be-processed image in the internal memory 121. Then, the processor 110 may obtain the to-be-processed image stored in the internal memory 121, and invoke related computer instructions to perform light supplementation processing on the to-be-processed image, to obtain a light-supplemented image. Specifically, the processor 110 may obtain the to-be-processed image stored in the internal memory 121, and invoke the related computer instructions to perform the following steps: obtaining a part of the to-be-processed image as a first image (for example, obtaining a portrait of a first user as the first image); calculating an albedo image and an illumination image of the first image, to obtain a light-supplemented first image; and then replacing the first image in the to-be-processed image with the light-supplemented first image, to obtain the light-supplemented image.

A process in which the processor 110 obtains the illumination image by using the first image is as follows.

1. The processor 110 calculates, by using the first image, a normal vector of any pixel in the first image in three-dimensional space, to obtain a normal vector image of the first image.
2: The processor 110 estimates first ambient light corresponding to a first portrait in the first image, to obtain first spherical harmonic illumination of the first portrait.
3: The processor 110 calculates pose information of the first portrait in the first image, to obtain a direction of the first portrait.
4: The processor 110 adjusts the first spherical harmonic illumination based on the first spherical harmonic illumination and the direction of the first portrait, to obtain second spherical harmonic illumination.
5. Generate the illumination image corresponding to the first image based on the normal vector image and the second spherical harmonic illumination.

In conclusion, in embodiments of this application, the processor 110 may invoke computer instructions stored in the internal memory 121, to enable the electronic device to perform the image light supplementation method in embodiments of this application.

The foregoing embodiments are merely intended for describing the technical solutions of this application, but not for limiting this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, without departing from the scope of the technical solutions of embodiments of this application.

As used in the foregoing embodiments, based on the context, the term "when" may be interpreted as a meaning of "if", "after", "in response to determining . . . ", or "in response to detecting . . . ". Similarly, based on the context, the phrase "if determining" or "if detecting (a stated condition or event)" may be interpreted as a meaning of "when determining . . . ", "in response to determining . . . ", "when detecting (a stated condition or event)", or "in response to detecting . . . (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, such as a server or a data center in which one or more usable mediums are integrated. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The foregoing storage medium includes: any medium that can store program code, such as a ROM, a random access memory RAM, a magnetic disk, or an optical disc.

What is claimed is:

1. An image light supplementation method, applied to an electronic device comprising a camera, the method comprising:
    displaying a first interface, wherein the first interface comprises a first control;
    detecting a first operation for the first control;
    acquiring a to-be-processed image through the camera in response to the first operation, wherein the to-be-processed image comprises a first target object, and the first target object is in first ambient light;
    obtaining a first ambient light parameter based on a first region image, wherein the first region image is an image of the first target object in the to-be-processed image;
    determining a pose parameter of the first target object in the to-be-processed image, wherein the pose parameter identifies pose information of the first target object;
    determining a second ambient light parameter based on the first ambient light parameter and the pose parameter;
    obtaining an illumination image based on a normal vector image and the second ambient light parameter, wherein the normal vector image is an image obtained based on a normal vector feature of the to-be-processed image; and obtaining a light-supplemented image based on the illumination image and an albedo image, wherein the albedo image is an image obtained based on an albedo feature of the to-be-processed image.

2. The method according to claim 1, wherein obtaining the illumination image based on the normal vector image and the second ambient light parameter comprises:

obtaining the illumination image based on the normal vector image and the second ambient light parameter, wherein the normal vector image is an image obtained based on a normal vector feature of the first region image;

wherein obtaining the light-supplemented image based on the illumination image and the albedo image comprises:

obtaining the light-supplemented image based on the illumination image and the albedo image, wherein the albedo image is obtained based on an albedo feature of the first region image; and wherein after obtaining the light-supplemented image based on the illumination image and the albedo image, the method further comprises:

replacing the first region image in the to-be-processed image with the light-supplemented image.

3. The method according to claim 1, wherein in a case that the albedo image is the image obtained based on the albedo feature of the to-be-processed image, the albedo image describes acceptance degrees of any pixel in the to-be-processed image to light intensity on a red channel, a green channel, and a blue channel, and the illumination image describes, in second ambient light, light intensity of any pixel in the to-be-processed image on the red channel, the green channel, and the blue channel; or in a case that the albedo image is the image obtained based on the albedo feature of the first region image, the albedo image describes acceptance degrees of any pixel in the first region image to light intensity on a red channel, a green channel, and a blue channel, and the illumination image describes, in second ambient light, light intensity of any pixel in the first region image on the red channel, the green channel, and the blue channel.

4. The method according to claim 1, wherein the first target object is a portrait of a first user.

5. A non-transitory computer-readable storage medium, comprising instructions, wherein when the instructions are run on an electronic device, the electronic device is enabled perform the method according to claim 1.

6. The method according to claim 1, wherein the first ambient light parameter is first spherical harmonic illumination, and the second ambient light parameter is second spherical harmonic illumination; and determining the second ambient light parameter based on the first ambient light parameter and the pose parameter further comprises:

determining, by the electronic device, the first spherical harmonic illumination of the first ambient light, wherein the first spherical harmonic illumination indicates information about the first ambient light, and the information comprises light intensity and a direction of the first ambient light, and light intensity and a direction of any point around the first target object in the first ambient light;

determining a direction of the first target object based on the pose parameter of the first target object, wherein the pose parameter of the first target object comprises at least one of a pitch angle, a yaw angle, a roll angle, or other pose information of the first target object in a camera coordinate system, and the direction of the first target object describes an orientation of the first target object;

obtaining, based on the first spherical harmonic illumination and the direction of the first target object, light intensity and a direction of supplemented light; and adjusting the first spherical harmonic illumination based on the light intensity and the direction of the supplemented light, to obtain the second spherical harmonic illumination, wherein the second spherical harmonic illumination indicates information about the second ambient light, and the information comprises light intensity and a direction of the second ambient light, and light intensity and a direction of any point around the first target object in the second ambient light.

7. The method according to claim 6, wherein obtaining, based on the first spherical harmonic illumination and the direction of the first target object, light intensity and the direction of supplemented light further comprises:

determining the light intensity and the direction of the first ambient light based on the first spherical harmonic illumination;

using a plane formed by a direction of a first portrait and the direction of the first ambient light as a second plane;

determining, in the second plane, a direction whose angle with the direction of the first ambient light is 0° to 10° as the direction of the supplemented light; and determining 0.25 times the light intensity of the first ambient light as the light intensity of the supplemented light.

8. The method according to claim 6, wherein obtaining, based on the first spherical harmonic illumination and the direction of the first target object, the light intensity and the direction of supplemented light further comprises:

determining the light intensity of the first ambient light based on the first spherical harmonic illumination;

determining 0.25 times the light intensity of the first ambient light as the light intensity of the supplemented light; and determining a direction of a first portrait as the direction of the supplemented light.

9. The method according to claim 6, wherein obtaining, based on the first spherical harmonic illumination and the direction of the first target object, the light intensity and the direction of the supplemented light comprises:

determining the light intensity and the direction of the first ambient light based on the first spherical harmonic illumination;

using a plane formed by the direction of the first target object and a first direction as a first plane, wherein the first direction is a direction that rotates around a Z axis of the camera coordinate system at a same angle as the roll angle and is parallel to one of a start side or an end side of the roll angle;

determining a direction meeting a first preset condition as the direction of the supplemented light based on the direction of the first ambient light, the direction of the first target object, and the first plane; and determining 0.25 times the light intensity of the first ambient light as the light intensity of the supplemented light.

10. The method according to claim 9, wherein the first preset condition is that:
- a projection of the direction of the supplemented light on the first plane is a first projection, and the first projection coincides with a second projection, wherein the second projection is a projection of the direction of the first ambient light on the first plane;
- an angle between the direction of the supplemented light and the second projection is a first angle, and the first angle is 0.8 to 2 times a second angle, wherein the second angle is an angle between the direction of the first ambient light between the second projection; and
- the direction of the supplemented light is on one side of the first plane, but the direction of the first ambient light is on the other side of the first plane.

11. The method according to claim 9, wherein in a case that the supplemented light comprises first supplemented light and second supplemented light, the direction of the supplemented light comprises a direction of the first supplemented light and a direction of the second supplemented light, and the first preset condition is that:
- the first supplemented light is on a first side of the first plane, but the second supplemented light is on a second side of the first plane;
- a projection of the first supplemented light on the first plane is a third projection, a projection of the second supplemented light on the first plane is a fourth projection, and the third projection coincides with the fourth projection;
- an angle between the third projection and a direction of a first portrait and an angle between the fourth projection and the direction of the first portrait are 10° to 20°; and
- an angle between the first supplemented light and a third projection and an angle between the second supplemented light and the fourth projection are 40° to 50°.

12. The method according to claim 9, wherein in a case that the supplemented light comprises first supplemented light and second supplemented light, the direction of the supplemented light comprises a direction of the first supplemented light and a direction of the second supplemented light, and the first preset condition is that:
- the first supplemented light is on a first side of the first plane, but the second supplemented light is on a second side of the first plane;
- a projection of the first supplemented light on the first plane is a third projection, a projection of the second supplemented light on the first plane is a fourth projection, and the third projection coincides with the fourth projection;
- the third projection and the fourth projection coincide with a spherical center G; and
- an angle between the direction of the first supplemented light and a direction of a first portrait and an angle between the direction of the second supplemented light and the direction of the first portrait are 90°.

13. An electronic device, wherein the electronic device comprises one or more processors and one or more memories, wherein the one or more memories are coupled to the one or more processors, the one or more memories are configured to store computer program code, the computer program code comprises computer instructions, and when the one or more processors execute the computer instructions, the electronic device is enabled to:
- display a first interface, wherein the first interface comprises a first control;
- detect a first operation for the first control;
- acquire a to-be-processed image through a camera in response to the first operation, wherein the to-be-processed image comprises a first target object, and the first target object is in first ambient light;
- obtain a first ambient light parameter based on a first region image, wherein the first region image is an image of the first target object in the to-be-processed image;
- determine a pose parameter of the first target object in the to-be-processed image, wherein the pose parameter identifies pose information of the first target object;
- determine a second ambient light parameter based on the first ambient light parameter and the pose parameter;
- obtain an illumination image based on a normal vector image and the second ambient light parameter, wherein the normal vector image is an image obtained based on a normal vector feature of the to-be-processed image; and
- obtain a light-supplemented image based on the illumination image and an albedo image, wherein the albedo image is an image obtained based on an albedo feature of the to-be-processed image.

14. A chip system, wherein the chip system is used in an electronic device, the chip system comprises one or more processors, and the processor is configured to invoke computer instructions to enable the electronic device to:
- display a first interface, wherein the first interface comprises a first control;
- detect a first operation for the first control;
- acquire a to-be-processed image through a camera in response to the first operation, wherein the to-be-processed image comprises a first target object, and the first target object is in first ambient light;
- obtain a first ambient light parameter based on a first region image, wherein the first region image is an image of the first target object in the to-be-processed image;
- determine a pose parameter of the first target object in the to-be-processed image, wherein the pose parameter identifies pose information of the first target object;
- determine a second ambient light parameter based on the first ambient light parameter and the pose parameter;
- obtain an illumination image based on a normal vector image and the second ambient light parameter, wherein the normal vector image is an image obtained based on a normal vector feature of the to-be-processed image; and
- obtain a light-supplemented image based on the illumination image and an albedo image, wherein the albedo image is an image obtained based on an albedo feature of the to-be-processed image.

* * * * *